(12) United States Patent
Mukherjee

(10) Patent No.: US 11,617,984 B2
(45) Date of Patent: Apr. 4, 2023

(54) SYSTEM AND METHOD FOR CONDITIONING SYNGAS AND CAPTURING CARBON DIOXIDE FROM CONDITIONED SYNGAS FOR PRODUCTION OF POWER, CHEMICALS, AND OTHER VALUE ADDED PRODUCTS

(71) Applicant: Dastur Energy, Inc., Austin, TX (US)

(72) Inventor: Atanu Mukherjee, Salt Lake (IN)

(73) Assignee: Dastur Energy, Inc., Austin, TX (US)

( * ) Notice: Subject to any disclaimer, the term of this patent is extended or adjusted under 35 U.S.C. 154(b) by 0 days.

(21) Appl. No.: 17/483,685

(22) Filed: Sep. 23, 2021

(65) Prior Publication Data
US 2022/0088535 A1 Mar. 24, 2022

Related U.S. Application Data

(60) Provisional application No. 63/082,543, filed on Sep. 24, 2020.

(51) Int. Cl.
*B01D 53/62* (2006.01)
*B01D 53/78* (2006.01)
*C01B 3/12* (2006.01)

(52) U.S. Cl.
CPC ............ *B01D 53/78* (2013.01); *B01D 53/62* (2013.01); *C01B 3/12* (2013.01); *B01D 2257/504* (2013.01); *B01D 2258/025* (2013.01); *C01B 2203/0283* (2013.01); *C01B 2203/16* (2013.01); *C01B 2203/86* (2013.01)

(58) Field of Classification Search
CPC .. B01D 53/78; B01D 53/62; B01D 2257/504; B01D 2258/025; C01B 3/12; C01B 2203/0283; C01B 2203/16; C01B 2203/86
See application file for complete search history.

(56) References Cited

U.S. PATENT DOCUMENTS

2014/0264178 A1 9/2014 Abbott et al.

FOREIGN PATENT DOCUMENTS

| JP | 2012021144 A | 2/2012 | |
| WO | WO 2013 079 323 A1 * | 6/2013 | ............ B01J 37/18 |
| WO | 2015101717 A1 | 7/2015 | |

OTHER PUBLICATIONS

International Search Report and Written Opinion dated Jan. 4, 2022 in PCT Application No. PCT/US2021/051756, Dastur Energy, Inc., pp. 1-12.

* cited by examiner

*Primary Examiner* — Timothy C Vanoy
(74) *Attorney, Agent, or Firm* — Robert C. Kowert; Kowert, Hood, Munyon, Rankin & Goetzel, P.C.

(57) ABSTRACT

An automatic control system (ACS) for capturing and utilizing carbon dioxide ($CO_2$) of one or more gases from one or more plants may receive, from one or more sensors, one or more parameters of at least one gas of one or more gases through a system gas flow inlet channel, a first volumetric flow rate of the one or more gases through a plug flow reactor (PFR), a second volumetric flow rate of the one or more gases through a bypass channel that bypasses the PFR, the $CO_2$ flowing into the $CO_2$ capture unit, or the syngas flowing into the $CO_2$ capture unit. The ACS may also command one or more flow controllers to modulate at least one of the first volumetric flow rate of the one or more gases through PFR or the second volumetric flow rate of the one or more gases through the bypass channel based on the one or more parameters.

20 Claims, 27 Drawing Sheets

Case 1: WGS – Stream Conditions of Optimal Configuration (32% bypass)

| Name | Vapour Fraction | Temperature [C] | Pressure [kPa] | Molar Flow [Nm3/h(gas)] | Mass Flow [kg/h] | Composition – Mole Fraction ||||| 
| | | | | | | CO | CO2 | H2 | H2O | N2 |
|---|---|---|---|---|---|---|---|---|---|---|
| BFG1 | 1 | 30 | 130 | 175730 | 228380 | 0.226 | 0.224 | 0.095 | 0 | 0.455 |
| BFG2 | 1 | 30 | 130 | 299250 | 388863 | 0.226 | 0.224 | 0.095 | 0 | 0.455 |
| BFG2-Comp | 1 | 146 | 340 | 299250 | 388863 | 0.226 | 0.224 | 0.095 | 0 | 0.455 |
| BFG2-Hot | 1 | 160 | 340 | 299250 | 388863 | 0.226 | 0.224 | 0.095 | 0 | 0.455 |
| BF-Gas | 1 | 30 | 130 | 475000 | 617243 | 0.226 | 0.224 | 0.095 | 0 | 0.455 |
| COMP2-out | 1 | 148 | 210 | 567961 | 691953 | 0.089 | 0.297 | 0.18 | 0.064 | 0.381 |
| H2/CO=2 | 1 | 86 | 130 | 567961 | 691953 | 0.089 | 0.287 | 0.18 | 0.064 | 0.381 |
| H2O_Ref_TP | 0 | 25 | 100 | 1 | 1 | 0 | 0 | 0 | 1 | 0 |
| PFR1-in | 1 | 160 | 340 | 392202 | 463573 | 0.172 | 0.171 | 0.072 | 0.237 | 0.347 |
| PFR1-out | 1 | 327 | 140 | 392211 | 463573 | 0.028 | 0.316 | 0.217 | 0.092 | 0.347 |
| PFR1-OutCool | 1 | 110 | 130 | 392211 | 463573 | 0.028 | 0.316 | 0.217 | 0.092 | 0.347 |
| Steam1 | 1 | 160 | 340 | 92952 | 74710 | 0 | 0 | 0 | 1 | 0 |
| Steam2 | 1 | 160 | 340 | 60521 | 48644 | 0 | 0 | 0 | 1 | 0 |
| WATER1 | 0 | 25 | 100 | 60521 | 48644 | 0 | 0 | 0 | 1 | 0 |
| WATER1A | 0 | 25 | 350 | 60521 | 48644 | 0 | 0 | 0 | 1 | 0 |
| WATER2 | 0 | 32 | 100 | 3112373 | 2501549 | 0 | 0 | 0 | 1 | 0 |
| WATER2A | 0 | 32 | 110 | 3112373 | 2501549 | 0 | 0 | 0 | 1 | 0 |
| WATER2B | 0 | 43 | 100 | 3112373 | 2501549 | 0 | 0 | 0 | 1 | 0 |
| WGS-out | 0.973 | 40 | 200 | 567961 | 691953 | 0.089 | 0.287 | 0.18 | 0.064 | 0.381 |

FIG. 11

Case II A: WGS – Stream Conditions

| Name | Vapour Fraction | Temperature [C] | Pressure [kPa] | Molar Flow [Nm3/h(gas)] | Mass Flow [kg/h] | Composition – Mole Fraction | | | | |
|---|---|---|---|---|---|---|---|---|---|---|
| | | | | | | CO | CO2 | H2 | H2O | N2 |
| BFG1 | 1 | 160 | 390 | | | 0.226 | 0.224 | 0.093 | 0 | 0.457 |
| BFG2 | 1 | 160 | 390 | 475000 | 617241 | 0.226 | 0.224 | 0.093 | 0 | 0.457 |
| BF-Gas | 1 | 30 | 115 | 475000 | 617241 | 0.226 | 0.224 | 0.093 | 0 | 0.457 |
| BFG-Comp-Net | 1 | 160 | 390 | 475000 | 617241 | 0.226 | 0.224 | 0.093 | 0 | 0.457 |
| Comp1-Out | 1 | 180 | 400 | 475000 | 617241 | 0.226 | 0.224 | 0.093 | 0.002 | 0.457 |
| OMP2-Out | 1 | 160 | 1000 | 577450 | 699553 | 0.03 | 0.34 | 0.23 | 0.002 | 0.374 |
| Solid-Ext | 1 | 44 | 990 | 196142 | 395121 | 0 | 1 | 0 | 0 | 0 |
| Effluents | 0 | 40 | 345 | 50934 | 40966 | 0 | 0.003 | 0 | 0.999 | 0 |
| Final | 1 | 44 | 990 | 373302 | 307987 | 0.047 | 0.318 | 0.35 | 0.014 | 0.579 |
| Rxng2-out | 1 | 150 | 350 | 620378 | 734079 | 0.026 | 0.318 | 0.217 | 0.09 | 0.348 |
| Rxng3-out | 0.933 | 40 | 345 | 620378 | 734079 | 0.028 | 0.317 | 0.217 | 0.09 | 0.348 |
| Rxng4-out | 1 | 150 | 995 | 577450 | 699553 | 0.03 | 0.34 | 0.224 | 0.022 | 0.374 |
| Rxng5-out | 0.986 | 40 | 990 | 577450 | 699553 | 0.03 | 0.34 | 0.224 | 0.022 | 0.374 |
| PFR1-in | 1 | 180 | 385 | 620365 | 734079 | 0.173 | 0.172 | 0.075 | 0.234 | 0.347 |
| PFR1-out | 1 | 327 | 350 | 620378 | 734079 | 0.026 | 0.318 | 0.217 | 0.09 | 0.348 |
| Sep1-Liq | 0 | 40 | 345 | 42920 | 34524 | 0 | 0.003 | 0 | 1 | 0 |
| Sep1-Vap | 1 | 40 | 345 | 577450 | 699553 | 0.03 | 0.34 | 0.224 | 0.022 | 0.374 |
| Sep2-Liq | 0 | 40 | 990 | 8080 | 6443 | 0 | 0.003 | 0 | 0.999 | 0 |
| Sep2-Vap | 1 | 40 | 990 | 569444 | 693110 | 0.031 | 0.344 | 0.227 | 0.006 | 0.39 |

FIG. 14

Case IIA: WGS – Stream Conditions

| Name | Vapour Fraction | Temperature [C] | Pressure [kPa] | Molar Flow [Nm3/h(gas)] | Mass Flow [kg/h] | Composition – Mole Fraction ||||| 
| --- | --- | --- | --- | --- | --- | --- | --- | --- | --- | --- |
| | | | | | | CO | CO2 | H2 | H2O | N2 |
| Steam1 | 1 | 160 | 400 | 145335 | 116828 | 0 | 0 | 0 | 1 | 0 |
| Steam2 | 1 | 160 | 400 | 7964 | 6401 | 0 | 0 | 0 | 1 | 0 |
| Steam3 | 1 | 160 | 400 | 8181 | 6575 | 0 | 0 | 0 | 1 | 0 |
| Steam4 | 1 | 160 | 400 | 7348 | 5906 | 0 | 0 | 0 | 1 | 0 |
| MATER1A | 0 | 32 | 400 | 8181 | 6575 | 0 | 0 | 0 | 1 | 0 |
| MATER2A | 0 | 32 | 400 | 7964 | 6401 | 0 | 0 | 0 | 1 | 0 |
| MATER3A | 0 | 32 | 100 | 4800092 | 3858804 | 0 | 0 | 0 | 1 | 0 |
| MATER3B | 0 | 32 | 100 | 4800092 | 3858804 | 0 | 0 | 0 | 1 | 0 |
| MATER4A | 0 | 43 | 400 | 7348 | 5906 | 0 | 0 | 0 | 1 | 0 |
| MATER5A | 0 | 32 | 100 | 2872372 | 2308850 | 0 | 0 | 0 | 1 | 0 |
| MATER5B | 0 | 43 | 100 | 2872372 | 2308850 | 0 | 0 | 0 | 1 | 0 |
| MATER-CW | 0 | 32 | 100 | 7672465 | 6166693 | 0 | 0 | 0 | 1 | 0 |
| MATER-CW1 | 0 | 32 | 100 | 7672465 | 6166693 | 0 | 0 | 0 | 1 | 0 |
| MATER-DM | 0 | 32 | 100 | 95171 | 76493 | 0 | 0 | 0 | 1 | 0 |
| MATER-DM1 | 0 | 32 | 400 | 95171 | 76493 | 0 | 0 | 0 | 1 | 0 |
| WGS-out | 1 | 150 | 350 | 620378 | 734079 | 0.028 | 0.316 | 0.217 | 0.09 | 0.348 |

FIG. 14 (continued)

Case IIB: WGS – Stream Conditions

| Name | Vapour Fraction | Temperature [C] | Pressure [kPa] | Molar Flow [Nm3/h(gas)] | Mass Flow [kg/h] | Composition – Mole Fraction ||||| 
|---|---|---|---|---|---|---|---|---|---|---|
| | | | | | | CO | CO2 | H2 | H2O | N2 |
| BF-Gas | 1 | 30 | 110 | 475000 | 617243 | 0.226 | 0.224 | 0.095 | 0 | 0.455 |
| BFG-Steam | 1 | 170 | 400 | 724783 | 818303 | 0.148 | 0.147 | 0.062 | 0.343 | 0.299 |
| CO2-H2O | 1 | 44 | 990 | 201444 | 395336 | 0 | 1 | 0 | 0 | 0 |
| Comp1-Out | 1 | 185 | 400 | 475000 | 617243 | 0.226 | 0.224 | 0.095 | 0 | 0.455 |
| COMP2-out | 1 | 199 | 1000 | 585000 | 705598 | 0.021 | 0.344 | 0.245 | 0.021 | 0.369 |
| Effluents | 0 | 40 | 295 | 150600 | 120639 | 0 | 0 | 0 | 1 | 0 |
| Final | 1 | 44 | 990 | 373333 | 301823 | 0.033 | 0.261 | 0.376 | 0.031 | 0.299 |
| Htxng1-out | 1 | 305 | 395 | 724783 | 818303 | 0.033 | 0.278 | 0.177 | 0.213 | 0.299 |
| Htxng3-out | 0.807 | 40 | 295 | 724783 | 818303 | 0.017 | 0.278 | 0.193 | 0.213 | 0.299 |
| Htxng4-out | 1 | 150 | 990 | 585000 | 705598 | 0.021 | 0.344 | 0.245 | 0.024 | 0.369 |
| Htxng5-out | 0.982 | 40 | 990 | 585000 | 705598 | 0.021 | 0.344 | 0.245 | 0.021 | 0.369 |
| PFR1-in | 1 | 350 | 395 | 724783 | 818303 | 0.148 | 0.147 | 0.062 | 0.343 | 0.299 |
| PFR1-out | 1 | 470 | 350 | 724783 | 818303 | 0.033 | 0.262 | 0.177 | 0.229 | 0.299 |
| PFR2-in | 1 | 160 | 345 | 724783 | 818303 | 0.033 | 0.262 | 0.177 | 0.229 | 0.299 |
| PFR2-out | 1 | 170 | 305 | 724783 | 818303 | 0.017 | 0.278 | 0.193 | 0.213 | 0.299 |
| Sep1-Liq | 0 | 40 | 295 | 139783 | 112404 | 0.021 | 0 | 0 | 1 | 0.036 |
| Sep1-Vap | 1 | 40 | 295 | 585000 | 705598 | 0.021 | 0.344 | 0.245 | 0.024 | 0.369 |
| Sep2-Liq | 0 | 40 | 990 | 10224 | 8231 | 0 | 0.001 | 0 | 0.999 | 0 |
| Sep2-Vap | 1 | 40 | 990 | 574778 | 697386 | 0.021 | 0.35 | 0.244 | 0.008 | 0.376 |

FIG. 16

Case II B: WGS – Stream Conditions

| Name | Vapour Fraction | Temperature [C] | Pressure [kPa] | Molar Flow [Nm3/h(gas)] | Mass Flow [kg/h] | Composition – Mole Fraction | | | | |
|---|---|---|---|---|---|---|---|---|---|---|
| | | | | | | CO | CO2 | H2 | H2O | N2 |
| Steam1 | 1 | 160 | 400 | 249793 | 200762 | 0 | 0 | 0 | 1 | 0 |
| Steam3 | 1 | 160 | 400 | 7782.4 | 6255.1 | 0 | 0 | 0 | 1 | 0 |
| Steam4 | 1 | 160 | 400 | 16232 | 13047 | 0 | 0 | 0 | 1 | 0 |
| Steam5 | 1 | 160 | 400 | 19860 | 15967 | 0 | 0 | 0 | 1 | 0 |
| WATER2A | 0 | 32 | 400 | 7782.4 | 6255.1 | 0 | 0 | 0 | 1 | 0 |
| WATER3A | 0 | 32 | 100 | 985836.4 | 792327.4 | 0 | 0 | 0 | 1 | 0 |
| WATER3B | 0 | 40 | 100 | 985856.4 | 792375.4 | 0 | 0 | 0 | 1 | 0 |
| WATER4A | 0 | 32 | 400 | 16232 | 13047 | 0 | 0 | 0 | 1 | 0 |
| WATER5A | 0 | 32 | 100 | 302055.4 | 242775.1 | 0 | 0 | 0 | 1 | 0 |
| WATER5B | 0 | 40 | 100 | 302055.4 | 242775.1 | 0 | 0 | 0 | 1 | 0 |
| WATER6A | 0 | 32 | 400 | 19860 | 15967 | 0 | 0 | 0 | 1 | 0 |
| WATER-CW | 0 | 32 | 100 | 1287931.28 | 1035150.5 | 0 | 0 | 0 | 1 | 0 |
| WATER-CW1 | 0 | 32 | 100 | 1287931.0 | 1035150.6 | 0 | 0 | 0 | 1 | 0 |
| WATER-DM | 0 | 32 | 100 | 113847 | 91584 | 0 | 0 | 0 | 1 | 0 |
| WATER-DM1 | 0 | 32 | 400 | 113847 | 91584 | 0 | 0 | 0 | 1 | 0 |
| WGS-out | 1 | 140 | 300 | 724786 | 618003 | 0.017 | 0.278 | 0.193 | 0.213 | 0.298 |

FIG. 16 (continued)

| Metrics 1702 | Case I 1000 | Case IIA 1300 | Case IIB 1500 |
|---|---|---|---|
| Target | $H_2$:CO = 2:1 | Max. $H_2$ | Max. $H_2$ |
| WGSR configuration | 1 LTS | 1 LTS | 1 HTS + 1 LTS |
| $H_2$ content in $H_2$-rich gas (after $CO_2$ removal) | 25 vol% | 36 vol% | 38 vol% |
| Unshifted fraction | 32% | 0 | 0 |
| CO Conversion | 85% | 84% | 89% |
| Net steam, tph | 30 tph | 40 tph | 110 tph |

FIG. 17

| Case 1 | Units | Cleaned BF Gas | Steam to MGSR | Shifted Gas from MGSR | Shifted Gas after Excess O₂ ... | H₂ fed into ... | Steam to Stripper | CO₂ to ... | CO₂ out from ... |
|---|---|---|---|---|---|---|---|---|---|
| Stream No. | | 1 | 2 | 3 | 4 | 5 | 6 | 7 | 8 |
| Gas Comp. | | | | | | | | | |
| CO | vol. % | 22.6 | 0 | 8.9 | 8.9 | 12.2 | 0 | 0 | 0 |
| CO₂ | vol. % | 22.2 | 0 | 28.7 | 28.7 | 2 | 0 | 100 | 100 |
| H₂ | vol. % | 9.2 | 0 | 17.9 | 17.9 | 24.6 | 0 | 0 | 0 |
| H₂O | vol. % | 0 | 100 | 6.5 | 6.5 | 8.9 | 100 | 0 | 0 |
| N₂ | vol. % | 46.5 | 0 | 38 | 38 | 52.2 | 0 | 0 | 0 |
| Gas Temp | °C | 37 | 160 | 110 | 149 | 40 | 145 | 50 | 31 |
| Gas Pressure | bar_g | 0.3 | 2.4 | 0.3 | 1.1 | 1 | 4 | 1 | 1.9 |
| H₂/CO | | 0.39 | n/a | n/a | 2.0 | 2.0 | n/a | n/a | n/a |
| Gas CV | kcal/Nm³ | 980 | n/a | 730 | 730 | 1004 | n/a | n/a | n/a |
| Gas Vol. Flow Rate | Mil Nm³/h | 0.475 | 0.088 | 0.568 | 0.568 | 0.413 | n/a | 0.139 | 0.139 |
| Mass Flow Rate | tph | 617 | 28 | 691 | 691 | 387 | 283 | 283 | 283 |

Note: BF gas composition is based on wet basis; tph refers to metric tonnes per hour

FIG. 18

| Final Stream Composition | Case II A (1300) | Case II B (1500) |
|---|---|---|
| CO | 5% | 3% |
| CO2 | 0% | 0% |
| Hydrogen | 36% | 38% |
| H2O | 1% | 1% |
| Methane | 0% | 0% |
| Nitrogen | 58% | 58% |
| H2S | 0% | 0% |

FIG. 19

| | Case I | Case IIA | Case IIB |
|---|---|---|---|
| Target composition | H₂:CO = 2:1 | Max. H₂ | Max. H₂ |
| %CO Conversion | 85 | 84 | 89 |
| H₂ content in H₂-rich gas (after CO₂ removal) | 25 vol% | 36 vol% | 38 vol% |
| Unshifted fraction | 32% | 0 | 0 |
| Net steam, tph | 30 | 40 | 110 |
| Pump Duty, kW | | 20.02 | 29.46 |
| Comp Power, MW | | 59.4 | 65.1 |
| Steam Temp, °C | | 160 | 160 |
| WGS in Temp, °C | | 160 | 350 |
| PFR1-out Temp, °C | | 327 | 472 |
| Boiler Water, tph | | 765 | 916 |
| Cooler Water, tph | | 61,667 | 1,03,515 |

FIG. 20

| Metrics | Case 1 |
|---|---|
| Target H₂-rich gas composition | $H_2:CO = 2:1$ |
| WGSR configuration | One high temperature shift reactor |
| H₂ content in H₂-rich gas (after CO₂ removal) | 27 vol% |
| Bypass fraction | 36% |
| CO Conversion | 82% |
| Net steam generation | 29 tph |
| Compression Duty | 7 MW |

FIG. 23

SYSTEM AND METHOD FOR CONDITIONING SYNGAS AND CAPTURING CARBON DIOXIDE FROM CONDITIONED SYNGAS FOR PRODUCTION OF POWER, CHEMICALS, AND OTHER VALUE ADDED PRODUCTS

PRIORITY CLAIMS

This application claims benefit of priority to U.S. Provisional Application Ser. No. 63/082,543, filed Sep. 24, 2020, entitled "SYSTEM AND METHOD FOR CAPTURING CARBON DIOXIDE AND FOR USING CAPTURED CARBON DIOXIDE IN PRODUCTION OF POWER AND CHEMICALS", which is hereby incorporated by reference herein its entirety.

FIELD OF THE INVENTION

The present disclosure relates to disclosure of novel system designs for capturing and utilizing carbon dioxide ($CO_2$) from steel plant process gases and use of optimization algorithms to determine the system configuration to attain optimal $CO_2$ emission goals, while ensuring the maximum economic return.

BACKGROUND

The statements in this section of the disclosure are merely to provide background information related to the present disclosure and may not constitute prior art.

Growing concerns over the adverse environmental impact of releasing carbon dioxide ($CO_2$) into the atmosphere may lead to an increased interest in systems and methods for capturing and recycling carbon dioxide generated in manufacturing processes. Interest may arise in recycling carbon dioxide in systems for manufacturing iron and steel.

In an Integrated Steel Plant (ISP), the Blast Furnace (BF), Coke Oven and Basic Oxygen Furnace (BOF) processes may contribute over 90% of the overall $CO_2$ emissions. In some $CO_2$ capture baseline technologies for steel plants—MDEA based post combustion $CO_2$ capture from Coke Oven Gas/Blast Furnace Stack (COG/BFS) and Coke Oven Gas/Power Plant Stack (COG/PPS)—may utilize low concentration $CO_2$ streams, resulting in a high capture cost ranging from about 65 US$/tonne $CO_2$ captured (EOR grade) to over 160 US$/tonne $CO_2$ captured (EOR grade) depending on scale. In some aspects, utilization of the BFG/BOFG/COG—a low-grade fuel—may be limited to use in reheating furnace and combined heat & power plant (CHP), resulting in a low 30-35% efficiency.

Methods for supplying oxygen-enriched air to Blast Furnaces for improved iron production and using its flue or top gas to generate power may be described in U.S. Pat. No. 8,133,298 B2.

Methods for combining iron production and power generation may be depicted in "Oxygen blast furnace and combined cycle (OBF-CC)—an efficient ironmaking and power generation process", Y. Jianwei et al., Energy 28 (2003) 825-835 and "Industrial implementation of Carbon Capture in Nordic industry sectors", K. Onarheim et al., NORDICCS Technical Report D4.2.1501/D18 (2015), 17-28.

Methods for removal of inert gases from flue or top gas before its combustion in a power plant may be disclosed in Polish Patent. No. PL216,441 B1.

Methods for $CO_2$ capture from steel plant process gases using amine- or ammonia-based chemical absorption techniques may be described in "Cost of Capturing $CO_2$ from Industrial Sources", W. M. Summers et al., DOE/NETL-2013/1602 (2014), 78-91 and "Process analysis for ammonia-based $CO_2$ capture in ironmaking industry", C. H. Rhee et al., Energy Procedia 4 (2011), 1486-1493.

Systems and methods for capture and utilization of steel plant process gases may have several techno-economical challenges to their implementations, including: (a) segregated solution for unit operations (b) high cost of capture (c) energy inefficiency (d) low process efficiency and (e) non-scalability. Due to these short-comings, there may be a need for optimally configured systems that can maximize the techno-economic impact and help achieve the sustainability goals, in a cost-neutral manner.

SUMMARY OF THE INVENTION

The present disclosure provides novel system designs for carbon capture, utilization, and storage (CCUS), through unique combinations of gas mixing, gas conditioning, carbon capture, and/or plant-wide fuel conversion.

In the system described herein, steel plant processes may be optimized by an automated control system that monitors processes through multiple flow controllers for mixing process gases and may then alter the gas composition using novel water gas shift reactor (WGSR) schemes. The system may provide higher $CO_2$ stream concentration, more efficient carbon capture, and conversion of $CO_2$ stripped steel process gases to Hydrogen-rich fuels with higher energy value. The higher energy Hydrogen-rich fuel may be used for power generation, along with production of methanol/ethanol, hydrogen, ammonia, and/or urea.

In various embodiments of the disclosure, the control system may implement one or more multivariate system optimization algorithms that allow a determination of an optimal system configuration, including gas mixing and distribution, equipment sizing, technology and design, $CO_2$ capture volumes and cost, and product output volumes. Thus, the system optimization algorithms may maximize the economic value and may be used to determine tailor-made energy-efficient, sustainable, and profitable carbon capture solutions for integrated steel plants (ISPs).

The details of the system and methods described herein will be discussed in conjunction with the figures provided hereinbelow.

BRIEF DESCRIPTION OF THE FIGURES

FIG. 11 is an illustration indicating material flow for water gas shift process configurations according to some aspects.

FIG. 14 is an illustration indicating steam conditions for water gas shift process configurations according to some aspects.

FIG. 16 is an illustration indicating steam conditions for water gas shift process configurations according to some aspects.

FIG. 17 is an illustration indicating metrics for water gas shift process configurations according to some aspects.

FIG. 18 is an illustration indicating steam data for water gas shift process configurations according to some aspects.

FIG. 19 is an illustration indicating output steam compositions for water gas shift process configurations according to some aspects.

FIG. 20 is an illustration indicating output system parameters for water gas shift process configurations according to some aspects.

FIG. 23 is an illustration indicating metrics for water gas shift process configurations according to some aspects.

Figure 1:
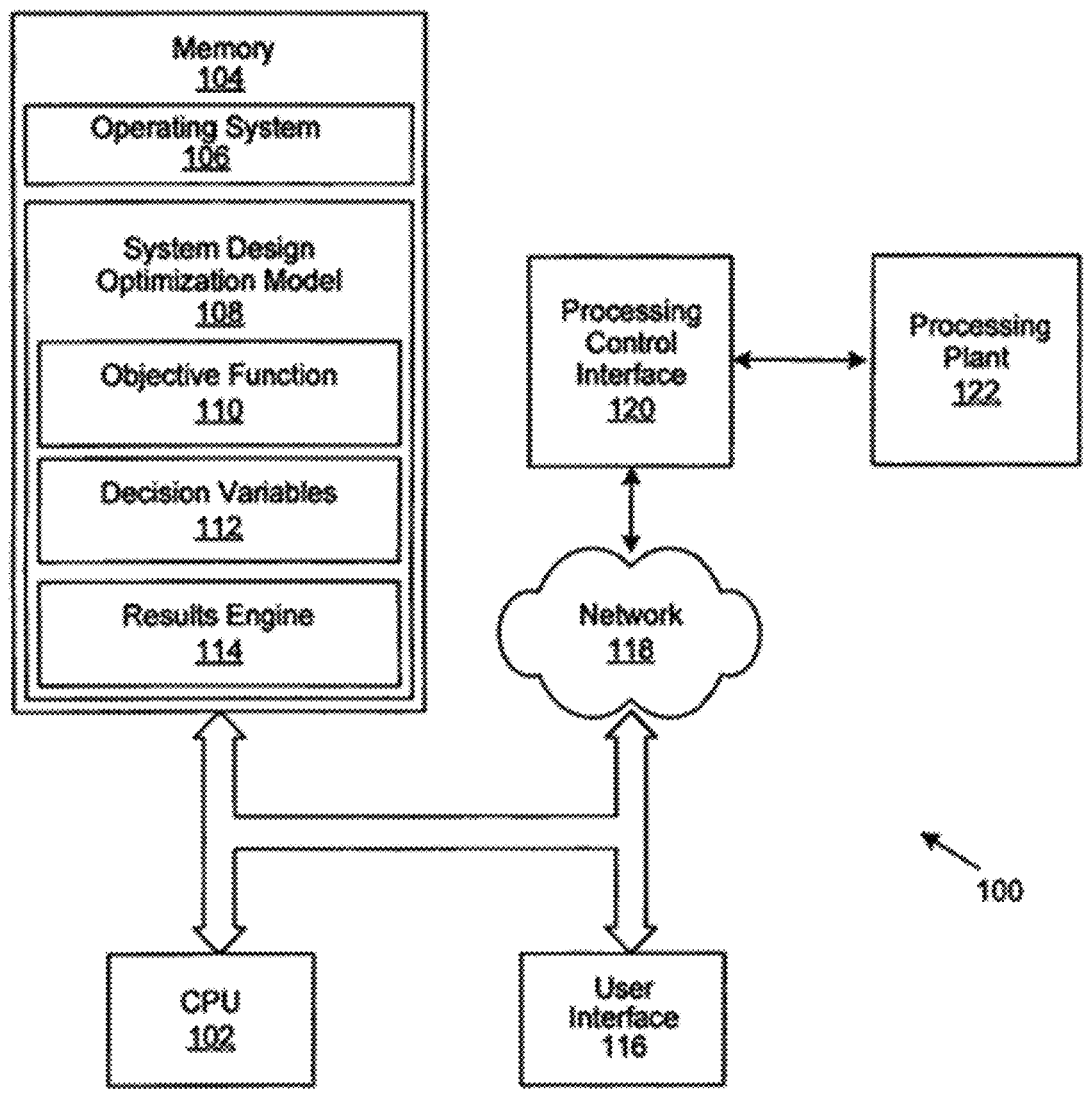
FIG. 1 is an illustration of data processing components used to implement data processing carbon capture, utilization, and storage (CCUS) methods according to some aspects.

The various embodiments described herein are susceptible to various modifications and alternative forms. Specific embodiments are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the appended claims. Any headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Embodiments of the disclosure provide systems and methods for carbon capture, utilization, and storage (CCUS), through a unique combination of gas mixing, gas conditioning, carbon capture, and plant-wide fuel conversion. The carbon capture mechanism may be pre-combustion (mostly physical solvent based under high pressure and high $CO_2$ concentration), or post-combustion (mostly chemical solvent based like MEA, MDEA, or other variants under low pressure and low $CO_2$ concentration), or Adsorption processes (like Vacuum Pressure Swing Adsorption), or membrane separation of $CO_2$ (based on permeability, selectivity and pressure gradient), or membrane/physical adsorption based separation along with cryogenic separation of $CO_2$.

Various illustrative aspects of the present disclosure will now be described in detail with reference to the accompanying figures. While various details are set forth in the following description, it will be appreciated that the present invention may be practiced without these specific details, and that numerous implementation-specific decisions may be made to the invention described herein to achieve the inventor's specific goals, such as compliance with process technology or design-related constraints, which will vary from one implementation to another. While such a development effort might be complex and time-consuming, it would nevertheless be a routine undertaking for those of skill in the art having the benefit of this disclosure.

The disclosure describes a novel system design for a CCUS using steel plant process gases as well as a multivariate system optimization algorithm for determining optimal system configurations. Instead of using the steel plant process gases (BFG/BOFG/COG) as a low-grade fuel in reheating furnaces and combined heat and power plant (CHP), the system described herein may enhance or maximizes carbon abatement. The system may include plant-wide fuel conversion and optimization of water gas shift processes (WGSP), carbon capture, transport and storage, enhanced oil recovery (EOR), and generation of co-products.

In the various embodiments of the CCUS, an automated control system (ACS) may use non-linear multivariate optimization algorithms to optimize the profitability (individual product or overall) and $CO_2$ goals, given specific system constraints. The ACS may also use algorithms to determine the optimal output product volumes and mixes, the optimal system configuration, component sizing and design, and system integration architecture. While profitability (or Return on Investment, ROI) may be a function of Earnings before Interest, Taxes, Depreciation and Amortization (EBITDA) and Investment, the $CO_2$ goals may be region/country specific.

FIG. 1 is a system block diagram of a data processing system 100 comprising a central processing unit (CPU) 102, a memory 104, and an operating system 106 that are operable to execute stored instructions to process data related to a system design optimization model 108 including an objective function 110, variables 112 and a results engine 114. Details relating to the system design optimization model 108 are described further herein. The user interface 116 may be used to communicate through the network 118 to access a processing interface 120 to control chemical processing in a processing plant 122 to optimize production in accordance with objectives provided by the system design optimization model 108.

Figure 2:
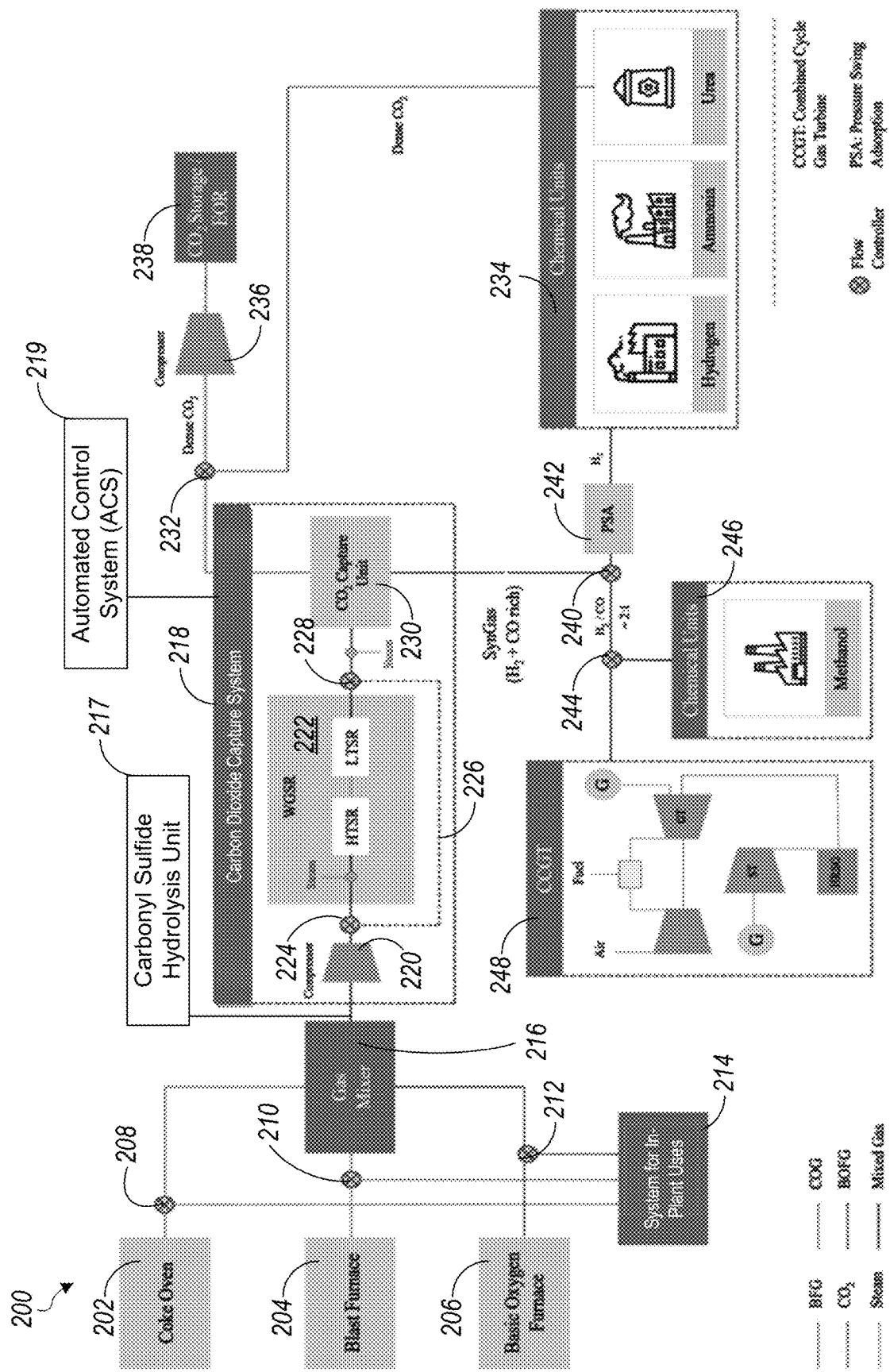
FIG. 2 is a schematic illustration of the carbon capture, utilization, and storage (CCUS) system according to some aspects.

FIG. 2 is a schematic illustration of the carbon capture, utilization, and storage (CCUS) system 200 according to some aspects. In some aspects, the CCUS system 200 may be for sustainable and economically viable large scale carbon capture, through gas mixing, gas conditioning, plant-wide fuel conversion, transportation and storage/enhanced oil recovery, along with generation of value-added products (such as power, methanol/ethanol, hydrogen, ammonia/urea).

The CCUS system 200 may include a plurality of plants such as a coke oven 202, a blast furnace 204, and a basic oxygen furnace 206. The coke oven 202 may output coke oven gas (COG) that may be controlled by a COG flow controller 208. The blast furnace 204 may output blast furnace gas (BFG) that may be controlled by a BFG flow controller 210. The basic oxygen furnace 206 may output basic oxygen furnace gas (BOFG) that may be controlled by a BOFG flow controller 212. Each of the COG flow controller 208, the BFG flow controller 210, and the BOFG flow controller 212 may control gas flow to the gas mixer 216. In some aspects, the BOFG flow controller 212 may additionally, or alternatively, control gas flow to a system for in-plant uses 214. The COG flow controller 208, the BFG flow controller 210, and the BOFG flow controller 212 may allow customized dialing of the various gas streams to obtain the desired gas compositions and volumes. For example, the flow controllers may be configured to provide appropriate volumes of the process gases for the system for in-plant uses 214 or to the gas mixer 216 for further processing.

The CCUS system 200 may also include a $CO_2$ capture system 218. Upon receiving gas flow from at least one of the coke oven 202, the blast furnace 204, or the basic oxygen furnace 206, the gas mixer 216, the gas mixer 216 may mix the gas and send the gas to the $CO_2$ capture system 218. The $CO_2$ capture system 218 may include a compressor 220, a water gas shift reactor (WGSR) 222, a WGSR inlet flow controller 224, a WGSR gas bypass channel 226, a WGSR outlet flow controller 228, and a $CO_2$ capture unit 230. The WGSR 222 may configured to covert carbon monoxide (CO) and water ($H_2O$) (vapor) to carbon dioxide ($CO_2$) and hydrogen ($H_2$). The WGSR 222 may be an example of a plug flow reactor (PFR). A PFR may be a reactor of cylindrical geometry to perform chemical reactions in continuous, flowing systems.

Upon receiving the gas from the gas mixer 216, the $CO_2$ capture system 218 may compress the gas in the compressor 220 before sending the gas to the WGSR inlet flow controller 224. The WGSR inlet controller 224 may receive the gas from the compressor 220 and control the flow of the gas to the WGSR 222. The WGSR 222 may receive the gas having carbon monoxide (CO) and water vapor ($H_2O$) and form $CO_2$ gas and Hydrogen ($H_2$) gas. After the WGSR 222 forms the $CO_2$ gas and the $H_2$ gas, the $CO_2$ gas and the $H_2$ gas are sent to the WGSR outlet flow controller 228. The WGSR outlet flow controller 228 receives the $CO_2$ gas and the $H_2$ gas and controls the flow of the $CO_2$ gas and the $H_2$ gas to the $CO_2$ capture unit 230. In some aspects, a carbonyl sulfide hydrolysis unit 217 may receive the CO and $H_2O$ from the gas mixer 216 for hydrolyzing SOx before the CO and $H_2O$ are received by the WGSR 222. Using the carbonyl sulfide hydrolysis unit 217, the operational flexibility and competitive capture cost of the CCUS system 200 may be about 30 US\$/tonne of $CO_2$ (EOR grade) enhancing the techno-economics of the CCUS system 200.

In addition, as described herein, the $CO_2$ capture system 218 also includes WGSR gas bypass channel 226. The WGSR gas bypass channel 226 permits the CO and the $H_2O$ from the compressor 220 to bypass the WGSR 222 and be sent directly to the $CO_2$ capture unit 230. For example, the WGSR inlet flow controller 224 may receive the CO gas and $H_2O$ gas from the compressor 220 and, in addition to controlling the flow of the CO gas and $H_2O$ gas to the WGSR 222, the WGSR inlet flow controller 224 may also control the flow of the CO gas and $H_2O$ gas to the WGSR gas bypass channel 226 bypassing the WGSR 222. The WGSR outlet flow controller 228, in addition to controlling the flow of the $CO_2$ gas and the $H_2$ gas from the WGSR 222 to the $CO_2$ capture unit 230, may also control the flow of the CO gas and $H_2O$ gas from the WGSR gas bypass channel 226 to the $CO_2$ capture unit 230. Upon receiving the CO gas and $H_2O$ gas from the WGSR gas bypass channel 226 and/or the $CO_2$ gas and the $H_2$ gas from the WGSR 222, the $CO_2$ capture unit 230 may process the gases to produce dense $CO_2$ and syngas. Syngas may include $H_2$ and CO, for example. A combination of the WGSR 222 and the $CO_2$ capture unit 230 may significantly enhance the quality and calorific value of the feed gas, making it suitable for generation of value-added products, while extracting an optimal amount of $CO_2$ at the lowest possible cost.

As described herein, the $CO_2$ capture unit 230 may process the gases from the WGSR 222 and the gases from WGSR gas bypass channel 226 to produce dense $CO_2$ and/or syngas. The syngas from the $CO_2$ capture unit 230 may have a quality (e.g., $H_2/CO::2:1$ or 100% $H_2$) strong enough to generate specific individual downstream products for less complex manipulation and use. After producing dense $CO_2$ and syngas, the $CO_2$ capture unit 230 may send at least some dense $CO_2$ gas to the dense $CO_2$ flow controller 230. The dense $CO_2$ flow controller 230 may control the flow of the dense $CO_2$ gas to the dense $CO_2$ compressor 236 for compressing the dense $CO_2$ gas and storing the compressed dense $CO_2$ gas in the $CO_2$ storage/enhanced oil recovery (EOR) unit 238. The dense $CO_2$ flow controller 232 may, additionally or alternatively, control the flow of the dense $CO_2$ gas to the chemical unit systems 234 for further processing to generate hydrogen, ammonia, and urea.

After producing dense $CO_2$ and Syngas, the $CO_2$ capture unit 230 may send at least some syngas to the syngas flow controller 240. The syngas flow controller 240 may control the flow of the syngas to the chemical unit systems 234, via the pressure swing adsorption (PSA) unit 242, for further processing to generate hydrogen, ammonia, and urea. For example, the syngas flow controller 240 may separate the syngas into non-$H_2$ gas and $H_2$ gas and control the flow of $H_2$ gas to the chemical unit systems 234, via the pressure swing adsorption (PSA) unit 242, for further processing to generate hydrogen, ammonia, and urea.

The syngas flow controller 240 may, additionally or alternatively, control the flow of the syngas to another chemical unit system 246 and/or a combined cycle gas turbine (CCGT) system 248, via an additional syngas flow controller 244. For example, after receiving the syngas from the syngas flow controller 240, the additional syngas flow controller 244 may send the syngas including at least one of CO gas or $H_2$ gas to the additional chemical units system 246 for further processing to produce methanol. As another example, after receiving the syngas from the syngas flow controller 240, the additional syngas flow controller 244 may send the syngas including at least one of $CO_2$ gas or $H_2$ gas to the CCGT system 248 for power generation. Feeding the $CO_2$-stripped, hydrogen-rich fuels with higher energy value into the CCGT system 248 boosts the efficiency of the CCGT system 248 to about 50-55% leading to efficient generation of power while producing a significant impact on $CO_2$ emissions of the CCGT system 248.

The CCUS system 200 described herein may be based on pre-combustion capture methods for capturing over 70% of $CO_2$ emissions (with $CO_2$ capture efficiency of over 95%) from an international energy agency statistics package (ISP)

at a cost of about 30 US$/tonne of $CO_2$ captured (EOR grade). The CCUS system 200 (including $CO_2$ capture technology) may be based on the principle of physical absorption including commercially available examples such as SELEXOL® and RECTISOL™. Moreover, the CCUS system 200 utilizing the captured carbon and syngas to generate value-added products such as power, methanol/ethanol, hydrogen, ammonia, and may provide enhancements (e.g., maximization) of the techno-economic impact, leading to an overall economical and sustainable operation. The CCUS system 200 may take advantage of the relatively higher concentration of $CO_2$ gas (>20 vol. % $CO_2$) and availability of $CO_2$ in the blast furnace gas stream, compared to the flue gas streams (about 4-12 vol. %) ensuring more efficient and economic capture. In addition, the CCUS system 200 utilizing the WGSR 222 to perform compositional shift of the mixed gas may generate an even richer (>30 vol. %) $CO_2$ gas stream. Treating a more concentrated $CO_2$ gas stream in carbon dioxide capture system 218 may also allow lower equipment sizing and footprint, lower capital costs, and favorable capture techno-economics. The commercial availability of the individual process units such as the gas mixer 216, the $CO_2$ capture unit 230, the WGSR 222, and compressors (e.g., the compressor 220 and/or the dense $CO_2$ compressor 236) at industrial scale ensures their application at large scales and thus maximizes the economic impact of the invention.

In addition, the CCUS system 200 may include an automated control system (ACS) 219. The ACS may be in electronic communication with a plurality of sensors for determining one or more parameters associated with the CCUS system 200 and for commanding one or more flow controllers to modulate the one or more parameters of the CCUS system 200. For example, each of the coke oven 202, the blast furnace 204, the basic oxygen furnace 206, the COG flow controller 208, the BFG flow controller 210, the BOFG flow controller 212, the system for in-plant uses 214, the gas mixer 216, the carbonyl sulfide hydrolysis unit 217, the carbon dioxide capture system 218, the compressor 220, the WGSR 222, the WGSR inlet flow controller 224, the WGSR gas bypass channel 226, the WGSR outlet flow controller 228, the $CO_2$ capture unit 230, the dense $CO_2$ flow controller 232, the chemical unit systems 234, the dense $CO_2$ compressor 236, the $CO_2$ storage/enhanced oil recovery (EOR) unit 238, the syngas flow controller 240, the pressure swing adsorption (PSA) unit 242, the additional syngas flow controller 244, the additional chemical units system 246, the CCGT system 248, the flow channels therebetween may include or may be mounted with one or more sensors. The one or more sensors may be used by the ACS 219 for determining one or more parameters such as a flow rate, a temperature, a pressure, a fuel utilization, a chemical composition of a fluid. In addition, the COG flow controller 208, the BFG flow controller 210, the BOFG flow controller 212, the gas mixer 216, the compressor 220, the WGSR 222, the WGSR inlet flow controller 224, the WGSR outlet flow controller 228, the dense $CO_2$ flow controller 232, the dense $CO_2$ compressor 236, the syngas flow controller 240, the additional syngas flow controller 244, and the CCGT system 248 may include one or more actuators to throttle operations of the respective devices and/or to actuate one or more valves of the devices.

The ACS 219 may determine (e.g., receive) one or more parameters from one or more devices of the CCUS system 200. For example, the ACS 219 may receive one or more parameters of at least one gas of one or more gases through a system gas flow inlet channel (e.g., at an inlet of the WGSR inlet flow controller 224 or the outlet of the gas mixer 216), a first fraction of the one or more gases through the PFR, a second fraction of the one or more gases through a bypass channel (e.g., the WGSR has bypass channel), $CO_2$ flowing into a $CO_2$ capture unit (e.g., the $CO_2$ capture unit 230), or syngas flowing into the $CO_2$ capture unit (e.g., the $CO_2$ capture unit 230). Upon receiving the one or more parameters, the ACS 219 may command one or more flow controllers to modulate at least one of the first fraction of the one or more gases through PFR or the second fraction of the one or more gases through the bypass channel based on the one or more parameters.

For example, the ACS 219 may command at least one of the WGSR inlet flow controller 224 or the WGSR outlet flow controller 228 to modulate a volumetric flow rate through the flow through the WGSR 222 and/or a volumetric flow rate through the WGSR gas bypass channel 226. In some aspects, the ACS 219 may command one or more flow controllers to modulate at least one of the first fraction of the one or more gases through PFR or the second fraction of the one or more gases through the bypass channel based on at least one of a predetermined amount of $CO_2$ or a predetermined amount of syngas. In some aspects, the ACS 219 may command the one or more flow controllers to modulate the first fraction and the second fraction based on a cost model that utilizes a cost function to derive a cost based on a total system cost loss.

Figure 3:
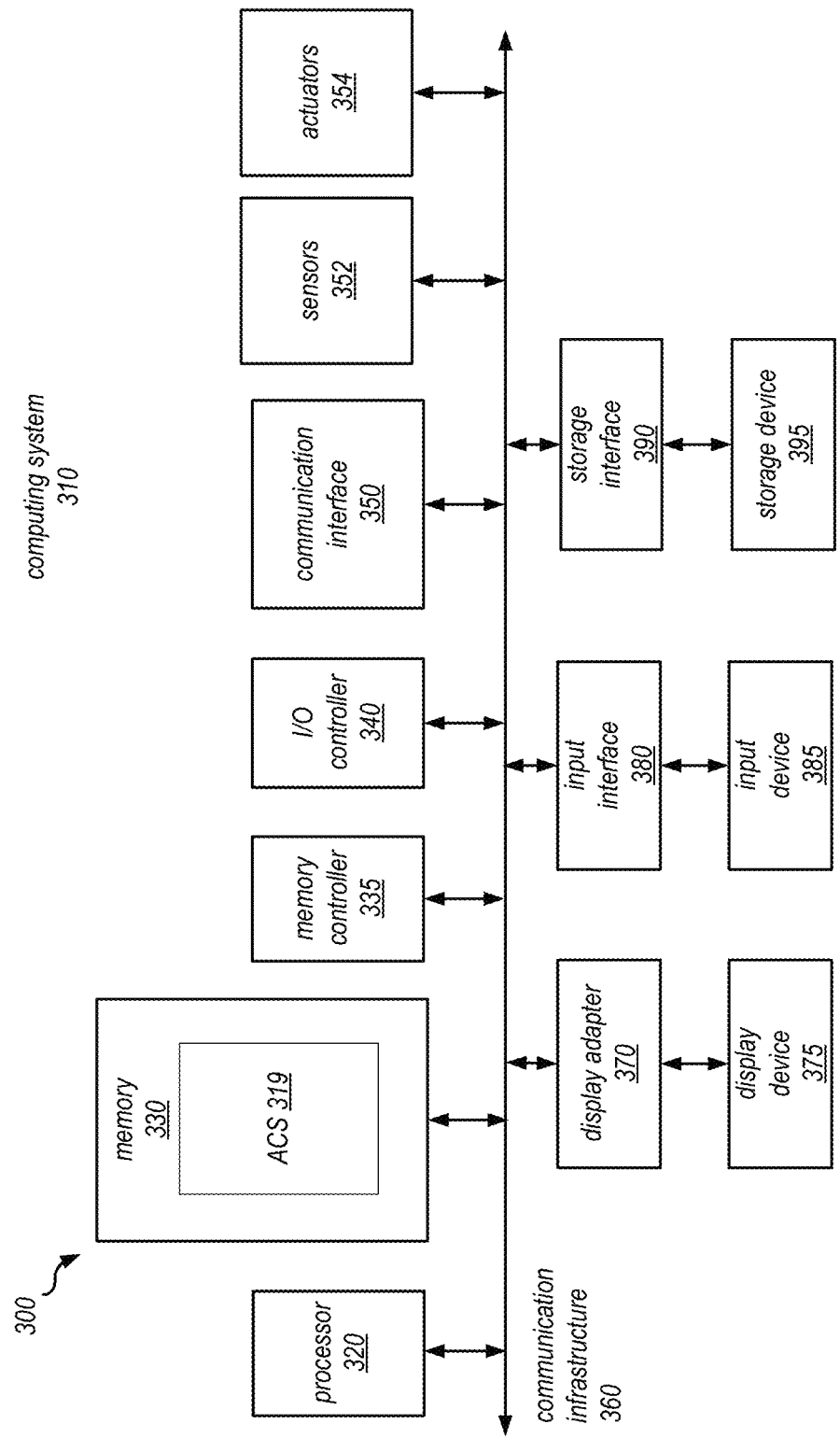
FIG. 3 is a block diagram of a computing system, which may be used to implement operations of a CCUS system according to some aspects.

FIG. 3 is a block diagram 300 of a computing system 310, which may be used to implement operations of a CCUS system according to some aspects. For example, computing system 310 can be used to implement the one or more operations of the ACS 219 of the CCUS system 200 illustrated in FIG. 2. Computing system 310 broadly represents a single or multi-processor computing device or system capable of executing computer-readable instructions. Examples of computing system 310 include, without limitation, any one or more of a variety of devices including workstations, personal computers, laptops, client-side terminals, servers, distributed computing systems, handheld devices, network appliances, storage controllers, and the like. In one configuration, computing system 310 may include at least one processor 320 and a memory 330. By executing the software that implements the anomaly detection pipeline manger 320, computing system 310 becomes a special purpose computing device that is configured to perform anomaly detection.

Processor 320 generally represents any type or form of processing unit capable of processing data or interpreting and executing instructions. In certain embodiments, processor 320 may receive instructions from a software application or module that may cause processor 320 to perform the functions of one or more of the embodiments described and/or illustrated herein. For example, processor 320 may perform and/or be a means for performing all or some of the operations described herein. Processor 320 may also perform and/or be a means for performing any other operations, methods, or processes described and/or illustrated herein. Memory 330 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments, computing system 310 may include both a volatile memory unit and a non-volatile storage device. In one example, program instructions implementing anomaly detection pipeline manager 3120 may be loaded into memory 330.

In certain embodiments, computing system 310 may also include one or more components or elements in addition to processor 320 and/or memory 330. For example, as shown, computing system 310 may include a memory controller 335, an Input/Output (I/O) controller 340, and a communication interface 350, each of which may be interconnected via a communication infrastructure. Communication infrastructure 360 generally represents any type or form of infrastructure capable of facilitating communication between one or more components of a computing device. Examples of communication infrastructure 360 include, without limitation, a communication bus (such as an Industry Standard Architecture (ISA), Peripheral Component Interconnect (PCI), PCI express (PCIe), or similar bus) and a network.

In some aspects the memory 330 may include an automated control system (ACS) 319. The ACS 319 may be the same as or at least similar to the ACS 219 illustrated in FIG. 2. The ACS 219 may include one or more executable instructions that, when executed by the processor 320, may cause the processor to perform one or more CCUS system operations. For example, the ACS 319 may include one or more executable instructions that, when executed by the processor 320, may cause the processor to determine, from at least one sensor of a plurality of sensors, one or more parameters of at least one gas of one or more gases through a system gas flow inlet channel, a first volumetric flow rate of the one or more gases through a plug flow reactor (PFR), a second volumetric flow rate of the one or more gases through a bypass channel that bypasses the PFR, $CO_2$ flowing into a $CO_2$ capture unit, or syngas flowing into the $CO_2$ capture unit. In some aspects, the ACS 319 may include one or more executable instructions that, when executed by the processor 320, may cause the processor to receive, from the at least one sensor of the one or more sensors, at least one parameter of the one or more parameters for determining the at least one parameter of the one or more parameters. As another example, the ACS 319 may include one or more executable instructions that, when executed by the processor 320, may cause the processor to command one or more flow controllers to modulate at least one of the first fraction (e.g., volumetric flow rate) of the one or more gases through PFR or the second fraction (e.g., volumetric flow rate) of the one or more gases through the bypass channel based on the one or more parameters. In some aspects, the ACS may command the one or more flow controllers to modulate at least one of the first volumetric flow rate or the second volumetric flow rate based on at least one of a predetermined amount of $CO_2$ or a predetermined amount of syngas. In some aspects, the ACS may command the one or more flow controllers to modulate the first volumetric flow rate or the second volumetric flow rate based on a cost model that utilizes a cost function to derive a cost based on a total cost loss.

In some aspects, the ACS 319 may include one or more executable instructions that, when executed by the processor 320, may cause the processor to detect an operation of the CCUS system. For example, the ACS 319 may include one or more executable instructions that, when executed by the processor 320, may cause the processor to detect an operation of a PFR of the CCUS system. In some aspects, the ACS 319 may include one or more executable instructions that, when executed by the processor 320, may cause the processor to direct the CCUS system to store carbon dioxide in a carbon dioxide storage unit. In some aspects, the ACS 319 may include one or more executable instructions that, when executed by the processor 320, may cause the processor to direct the CCUS system to provide syngas to one or more plants to produce at least one of methanol, ethanol, hydrogen, ammonia, urea, or power.

Memory controller 335 generally represents any type/form of device capable of handling memory or data or controlling communication between one or more components of computing system 310. In certain embodiments memory controller 335 may control communication between processor 320, memory 330, and I/O controller 340 via communication infrastructure 360, and may perform and/or be a means for performing, either alone or in combination with other elements, one or more of the operations or features described and/or illustrated herein. I/O controller 340 generally represents any type or form of module capable of coordinating and/or controlling the input and output functions of a computing device. For example, in certain embodiments I/O controller 340 may control or facilitate transfer of data between one or more elements of computing system 310, such as processor 320, memory 330, communication interface 350, display adapter 370, input interface 380, and storage interface 390.

The computing system 310 may be in communication with, via the communication infrastructure 360, one or more sensors 352 and/or one or more actuators 354. The one or more sensors 352 and/or the one or more actuators 354 may be used by the ACS 319 for determining one or more parameters associated with the CCUS system 200 and for commanding one or more flow controllers to modulate the one or more parameters of the CCUS system 200. For example, each of the coke over 202, the blast furnace 204, the basic oxygen furnace 206, the COG flow controller 208, the BFG flow controller 210, the BOFG flow controller 212, the system for in-plant uses 214, the gas mixer 216, the carbonyl sulfide hydrolysis unit 217, the carbon dioxide capture system 218, the compressor 220, the WGSR 222, the WGSR inlet flow controller 224, the WGSR gas bypass channel 226, the WGSR outlet flow controller 228, the $CO_2$ capture unit 230, the dense $CO_2$ flow controller 232, the chemical unit systems 234, the dense $CO_2$ compressor 236, the $CO_2$ storage/enhanced oil recovery (EOR) unit 238, the syngas flow controller 240, the pressure swing absorption (PSA) unit 242, the additional syngas flow controller 244, the additional chemical units system 246, the CCGT system 248, the flow channels therebetween may include or may be mounted with at least one sensors of the one or more sensors 352. The one or more sensors 352 may be used by the ACS 319 for determining one or more parameters such as a flow rate, a temperature, a pressure, a fuel utilization, a chemical composition of a fluid. In addition, the COG flow controller 208, the BFG flow controller 210, the BOFG flow controller 212, the gas mixer 216, the compressor 220, the WGSR 222, the WGSR inlet flow controller 224, the WGSR outlet flow controller 228, the dense $CO_2$ flow controller 232, the dense $CO_2$ compressor 236, the syngas flow controller 240, the additional syngas flow controller 244, and the CCGT system 248 may include at least one actuator of the one or more actuators 352 to throttle operations of the respective devices and/or to actuate one or more valves of the devices.

Communication interface 350 broadly represents any type/form of communication device/adapter capable of facilitating communication between computing system 310 and other devices and may facilitate communication between computing system 310 and a private or public network. Examples of communication interface 350 may include a wired network interface (e.g., network interface card), a wireless network interface (e.g., a wireless network interface card), a modem, and any other suitable interface. Communication interface 350 may provide a direct connection to a remote server via a direct link to a network, such as the Internet, and may also indirectly provide such a connection through, for example, a local area network. Communication interface 350 may also represent a host adapter configured to facilitate communication between computing system 310 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 310 may also include at least one display device 375 coupled to communication infrastructure 360 via a display adapter 370 that generally represents any type or form of device capable of visually displaying information forwarded by display adapter 370. Display adapter 370 generally represents any type or form of device configured to forward graphics, text, and other data from communication infrastructure 360 (or from a frame buffer, as known in the art) for display on display device 375. Computing system 310 may also include at least one input device 385 coupled to communication infrastructure 360 via an input interface 380. Input device 385 generally represents any type or form of input device capable of providing input, either computer or human generated, to computing system 310. Examples of input device 385 include a keyboard, a pointing device, a speech recognition device, or any other input device.

Computing system 310 may also include storage device 395 coupled to communication infrastructure 360 via a storage interface 390. Storage device 395 generally represents any type or form of storage devices or mediums capable of storing data and/or other computer-readable instructions. For example, storage device 395 may include a magnetic disk drive (e.g., a so-called hard drive), a floppy disk drive, a magnetic tape drive, an optical disk drive, a flash drive, or the like. Storage interface 390 generally represents any type or form of interface or device for transmitting data between storage device 395, and other components of computing system 310. Storage device 395 may be configured to read from and/or write to a removable storage unit configured to store computer software, data, or other computer-readable information. Examples of suitable removable storage units include a floppy disk, a magnetic tape, an optical disk, a flash memory device, or the like. Storage device 395 may also include other similar structures or devices for allowing computer software, data, or other computer-readable instructions to be loaded into computing system 310. For example, storage device 395 may be configured to read and write software, data, or other computer-readable information. Storage device 395 may also be a part of computing system 310 or may be separate devices accessed through other interface systems.

Many other devices or subsystems may be connected to computing system 310. Conversely, all of the components and devices illustrated in the figure need not be present to practice the embodiments described and/or illustrated herein. The devices and subsystems referenced above may also be interconnected in different ways from that shown in the figure. Computing system 310 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 310 for storage in memory via a network such as the Internet or upon a carrier medium.

The computer-readable medium containing the computer program may be loaded into computing system 310. All or a portion of the computer program stored on the computer-readable medium may then be stored in memory 330, and/or various portions of storage device 395. When executed by processor 320, a computer program loaded into computing system 310 may cause processor 320 to perform and/or be a means for performing the functions of one or more of the embodiments described/illustrated herein. Alternatively, one or more of the embodiments described and/or illustrated herein may be implemented in firmware and/or hardware.

Figure 4:
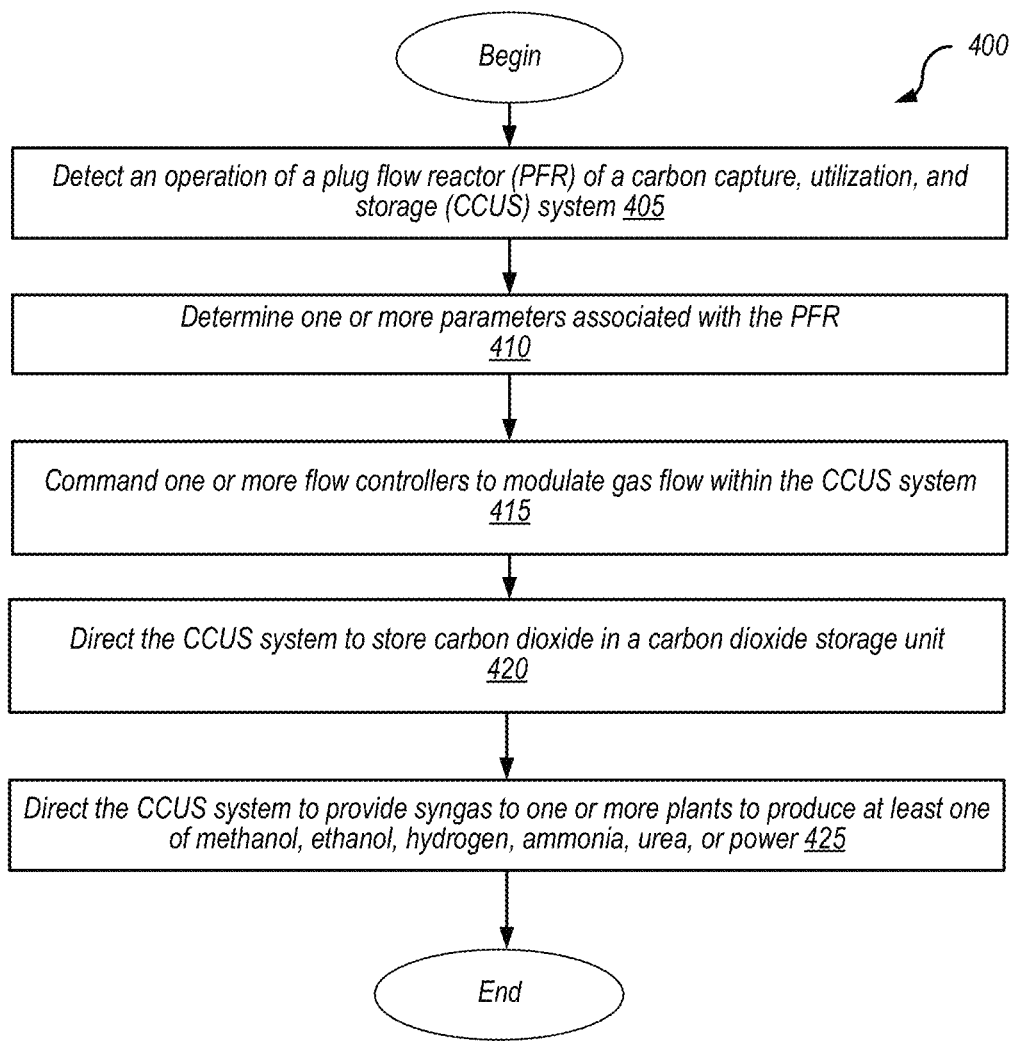
FIG. 4 illustrates an example method for performing CCUS system operations according to some aspects.

FIG. 4 illustrates an example method 400 for performing CCUS system operations according to some aspects. For example, the ACS 219 illustrated in FIG. 2 and/or the ACS 319 illustrated in FIG. 3 may perform the CCUS system operations.

As shown in block 405, an ACS may detect an operation of a plug flow reactor (PFR) of a carbon capture utilization, and storage (CCUS) system. For example, the ACS may detect an operation of at least the WGSR 222 of the CCUS system 200 of FIG. 2. As another example, the ACS may detect an operation of at least one of the coke oven 202, the blast furnace 204, the basic oxygen furnace 206, the COG flow controller 208, the BFG flow controller 210, the BOFG flow controller 212, the system for in-plant uses 214, the gas mixer 216, the carbonyl sulfide hydrolysis unit 217, the carbon dioxide capture system 218, the compressor 220, the WGSR 222, the WGSR inlet flow controller 224, the WGSR gas bypass channel 226, the WGSR outlet flow controller 228, the $CO_2$ capture unit 230, the dense $CO_2$ flow controller 232, the chemical unit systems 234, the dense $CO_2$ compressor 236, the $CO_2$ storage/enhanced oil recovery (EOR) unit 238, the syngas flow controller 240, the pressure swing adsorption (PSA) unit 242, the additional syngas flow controller 244, the additional chemical units system 246, the CCGT system 248, or the flow channels therebetween using at least one sensors of the one or more sensors 352.

As shown in block 410, the ACS may determine one or more parameters associated with the PFR. For example, the ACS may determine, using at least one sensor, one or more parameters of at least one of the coke oven 202, the blast furnace 204, the basic oxygen furnace 206, the COG flow controller 208, the BFG flow controller 210, the BOFG flow controller 212, the system for in-plant uses 214, the gas mixer 216, the carbonyl sulfide hydrolysis unit 217, the carbon dioxide capture system 218, the compressor 220, the WGSR 222, the WGSR inlet flow controller 224, the WGSR gas bypass channel 226, the WGSR outlet flow controller 228, the $CO_2$ capture unit 230, the dense $CO_2$ flow controller 232, the chemical unit systems 234, the dense $CO_2$ compressor 236, the $CO_2$ storage/enhanced oil recovery (EOR) unit 238, the syngas flow controller 240, the pressure swing adsorption (PSA) unit 242, the additional syngas flow controller 244, the additional chemical units system 246, the CCGT system 248, or the flow channels therebetween to determine a flow rate, a temperature, a pressure, a fuel utilization, a chemical composition, a combination thereof, or the like. In some aspects, the ACS may determine (e.g., receive from at least one sensor of a plurality of sensors) one or more parameters of at least one gas of one or more gases through a system gas flow inlet channel, a first volumetric flow rate of the one or more gases through a plug flow reactor (PFR), a second volumetric flow rate of the one or more gases through a bypass channel that bypasses the PFR, $CO_2$ flowing into a $CO_2$ capture unit, or syngas flowing into the $CO_2$ capture unit.

As shown in block 415, the ACS may command one or more flow controllers to modulate gas flow within the CCUS system. For example, the ACS may command one or more flow controllers to modulate at least one of the first volumetric flow rate of the one or more gases through PFR or the second volumetric flow rate of the one or more gases through the bypass channel based on the one or more parameters. In some aspects, the ACS may command the one or more flow controllers to modulate at least one of the first volumetric flow rate or the second volumetric flow rate based on at least one of a predetermined amount of $CO_2$ or a predetermined amount of syngas. In some aspects, the ACS may command the one or more flow controllers to modulate the first volumetric flow rate or the second volumetric flow rate based on a cost model that utilizes a cost function to derive a cost based on a total cost loss.

As shown in block 420, the ACS may direct the CCUS system to compress dense carbon dioxide steam to a specified pressure defined by storage or enhanced oil recovery (EOR) requirements. For example, the ACS may direct, using one or more actuators, $CO_2$ separated by $CO_2$ capture unit, to be compressed to a pressure need for at least one of $CO_2$ storage or enhanced oil recovery (EOR). As shown in block 425, the ACS may direct the CCUS system to provide syngas to one or more plants to produce at least one of methanol, ethanol, hydrogen, ammonia, urea, or power. For example, the ACS may direct, using one or more actuators, syngas, separated by the $CO_2$ capture unit, to a plant to produce at least one of methanol, ethanol, hydrogen, ammonia, urea, or power.

Please note that the functional block described herein are illustrated in FIG. 4 in merely one example arrangement. In other embodiments, the techniques and functionality described above may be performed using different steps in different orders or may be grouped into a different number of steps or may be performed as a single method without distinct steps.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Figure 5:
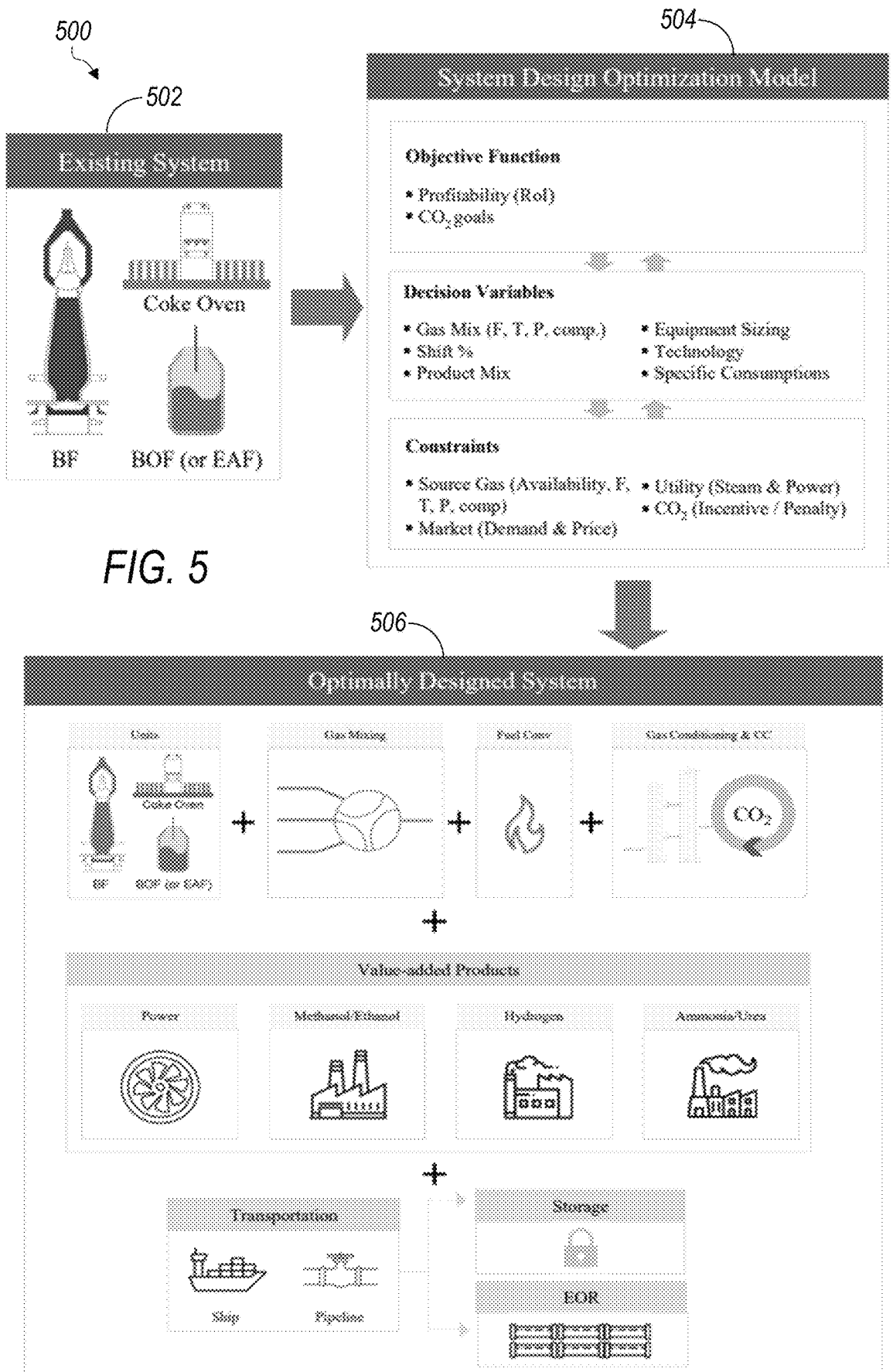
FIG. 5 is a schematic illustration of usage of the carbon capture, utilization, and storage (CCUS) system design algorithm and architecture for optimal configurations of large-scale carbon capture from steel plant process gases according to some aspects.

FIG. 5 is a schematic illustration of usage of a carbon capture, utilization, and storage (CCUS) system design algorithm and architecture 500 for optimal configurations of large-scale carbon capture from steel plant process gases according to some aspects. The carbon capture, utilization, and storage (CCUS) system design algorithm and architecture 500 may generally be used by plant managers, regional managers and/or high-level executives to optimize the relevant KPIs (profitability and $CO_2$ goals), considering the existing system constraints.

As shown in FIG. 5, the carbon capture, utilization, and storage (CCUS) system design algorithm and architecture 500 may including an existing system 502, a system design optimization model 504, and an optimally designed system 506. In some aspects, the existing system 502 may include at least one of a blast furnace, coke oven, basic oxygen furnace, or an electric arc furnace (EAF). The coke oven, the blast furnace, and the basic oxygen furnace may be the same as or at least similar to the coke oven 202, the blast furnace 204, and the basic oxygen furnace 206 illustrated in FIG. 2.

The system design optimization model 504 may include objective functions such as profitability (return on investment (ROI)) and $CO_2$ goals. The system design optimization model 504 may also include one or more decision variables such as flow rate of a gas mixture, a temperature of a gas mixture, a pressure of a gas mixture, a composition of a gas mixture, a shift percentage, a product mix, equipment sizing, one or more technologies, one or more specific consumptions. The decision variables or optimizing parameters include flow rate, temperature, pressure, chemical composition of gas mix (BFG/BOFG/COG), shift % in WGSRs, product mix, equipment sizing, technology, and specific consumptions.

The system design optimization model 504 may further include one or more constraints such as flow rate of a source gas, a temperature of a source gas, a pressure of a source gas, a composition of a source gas, external market demands and price of products, utility consumption (e.g., steam, power, fuel), and $CO_2$ incentives and penalties. The system design optimization model 504 constraints may be broadly grouped as plant specific constraints including availability of source gases, flow rate, temperature, pressure of source gases, composition of source gases, composition of source gases, utility (e.g., steam, power, fuel) consumption, utility (e.g., steam, power, fuel) flow rate, temperature, pressure and external constraints including market demand and price of products, and $CO_2$ incentives and penalties.

The optimally designed system 506 may include the existing system 502 such as at least one of a blast furnace, coke oven, basic oxygen furnace, or an electric arc furnace (EAF), gas mixing, fuel conversion, and gas conditioning and carbon capture. The optimally designed system 506 may also include value-added products including power, methanol/ethanol, hydrogen, ammonia, urea, and the like.

Figure 6:
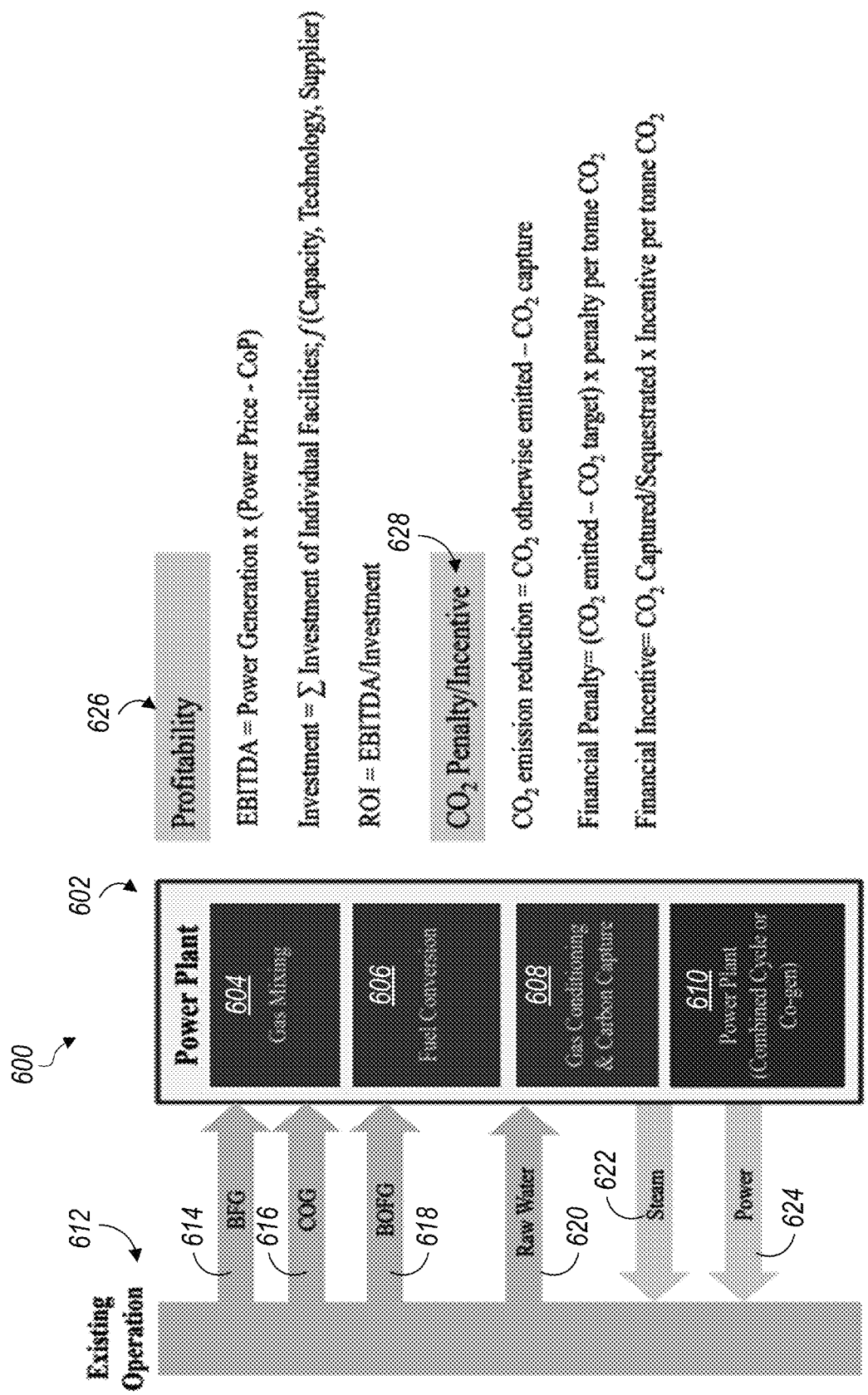
FIG. 6 is a schematic illustration of a system configuration for power generation according to some aspects.

FIG. 6 is a schematic illustration of a system configuration 600 for power generation according to some aspects. For example, the system configuration 600 for power generation may include a framework for determination of its profitability and $CO_2$ penalty/incentive. As shown in FIG. 6, the power plant 602 may include gas mixing 604, fuel conversion 606, gas conditioning and carbon capture 608, and power plant (combined cycle or co-generation) 610. From existing operations 612, the power plant 602 may receive blast furnace gas (BFG) 614, coke oven gas (COG) 616, basic oxygen furnace gas (BOFG) 618, and raw water 620. The power plant 602 may output to the existing operations 612 steam 622 and power 624. The system 600 may provide profitability 626 based on:

$$\text{EBITDA} = \text{Power Generation} \times (\text{Power Price} - \text{CoP}) \quad \text{(Eq. 1)}$$

$$\text{Investment} = \Sigma \text{Investment of Individual Facilities;} \\ f(\text{Capacity,Technology,Supplier}) \quad \text{(Eq. 2)}$$

$$\text{ROI} = \text{EBITDA}/\text{Investment} \quad \text{(Eq. 3)}$$

They system 600 may also provide carbon dioxide $CO_2$ penalties and incentives 628 based on:

$$CO_2 \text{ emission reduction} = CO_2 \text{ otherwise emitted} - CO_2 \text{ capture} \quad \text{(Eq. 4)}$$

$$\text{Financial Penalty} = (CO_2 \text{ emitted} - CO_2 \text{ target}) \times \text{Penalty per tonne } CO_2 \quad \text{(Eq. 5)}$$

$$\text{Financial Incentive} = \text{Sequestrated (or used for EOR)} \times \text{Incentive per tonne } CO_2 \quad \text{(Eq. 6)}$$

where EBITDA is Earnings before Interest, Taxes, Depreciation and Amortization, CoP is the cost of production and EOR is enhanced oil recovery. Penalties and incentives for $CO_2$ sequestrated (or used for EOR) may be based on country-specific policy like the EU Emissions Trading System (EU ETS) and the US 45Q policy.

Figure 7:
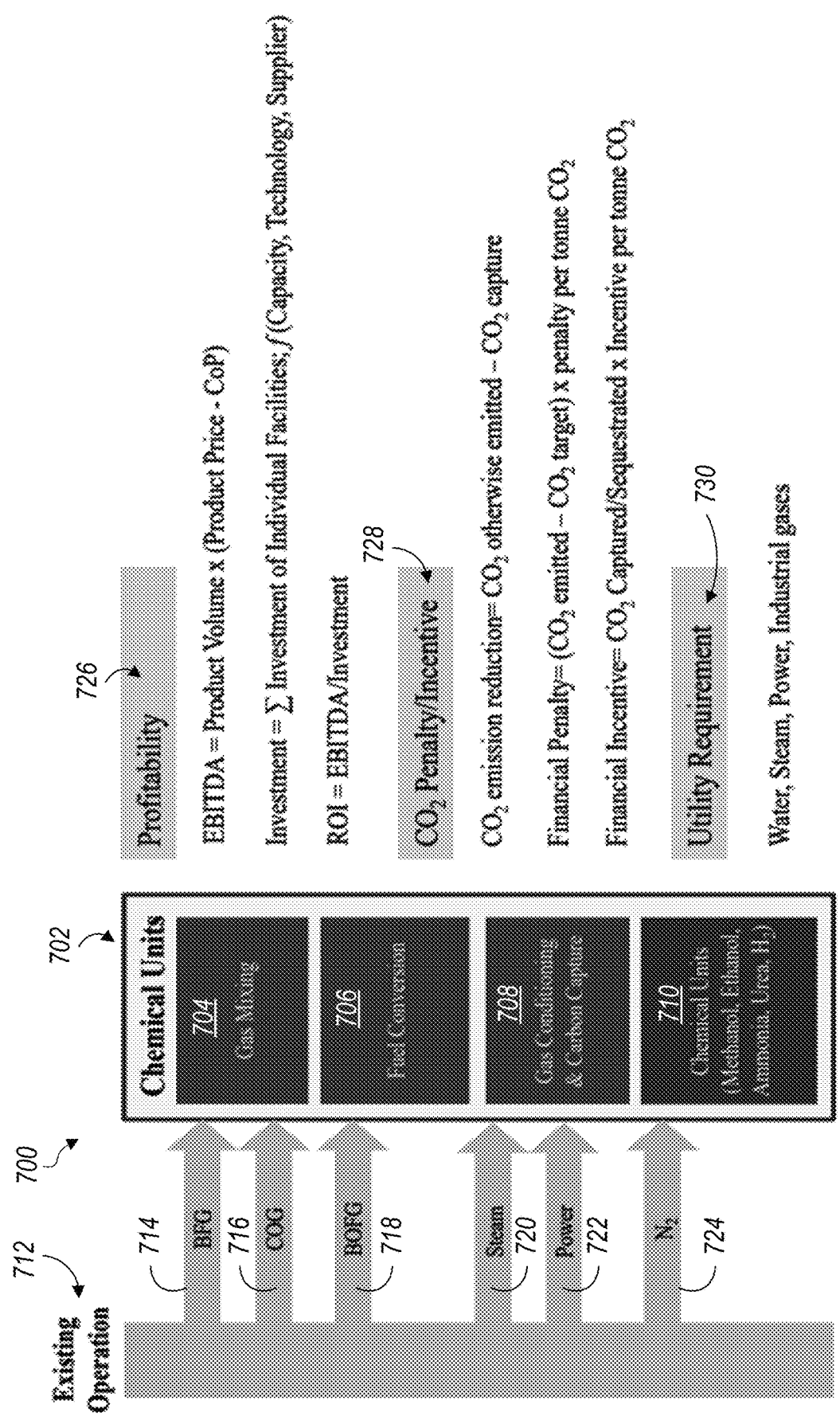
FIG. 7 is a schematic illustration of a system configuration for production of chemicals according to some aspects.

FIG. 7 is a schematic illustration of a system configuration 700 for production of chemicals according to some aspects. For example, the system configuration 700 for chemical units (methanol/ethanol, hydrogen, ammonia/urea) may include a framework for determination of its profitability and $CO_2$ penalty/incentive. As shown in FIG. 7, the chemical units 702 may include gas mixing 704, fuel conversion 706, gas conditioning and carbon capture 708, and chemical units (methanol, ethanol, ammonia, urea, and/or hydrogen) 710. From existing operations 712, the chemical units 702 may receive BFG 714, COG 716, BOFG 718, steam 720, power 722, and nitrogen 724. The system 700 may provide profitability 726 based on:

$$\text{EBITDA} = \text{Product Volume} \times (\text{Product Price} - \text{CoP}) \quad \text{(Eq. 7)}$$

$$\text{Investment} = \Sigma \text{Investment of Individual Facilities;} \\ f(\text{Capacity}, \text{Technology}, \text{Supplier}) \quad \text{(Eq. 8)}$$

$$\text{ROI} = \text{EBITDA}/\text{Investment} \quad \text{(Eq. 9)}$$

They system 700 may also provide carbon dioxide $CO_2$ penalties and incentives 728 based on:

$$CO_2 \text{ emission reduction} = CO_2 \text{ otherwise emitted} - CO_2 \text{ capture} \quad \text{(Eq. 10)}$$

$$\text{Financial Penalty} = (CO_2 \text{ emitted} - CO_2 \text{ target}) \times \text{Penalty per tonne CO} \quad \text{(Eq. 11)}$$

$$\text{Financial Incentive} = \text{Sequestrated (or used for EOR)} \times \text{Incentive per tonne } CO_2 \quad \text{(Eq. 12)}$$

where EBITDA is Earnings before Interest, Taxes, Depreciation and Amortization, CoP is the cost of production and EOR is enhanced oil recovery.

Penalty and Incentive for $CO_2$ sequestrated (or used for EOR) are based on country-specific policy like the EU Emissions Trading System (EU ETS) and the US 45Q policy. For the case of the chemical units, additional utility requirement 730 such as water, steam, power and industrial gases may also be taken into account.

Figure 8:
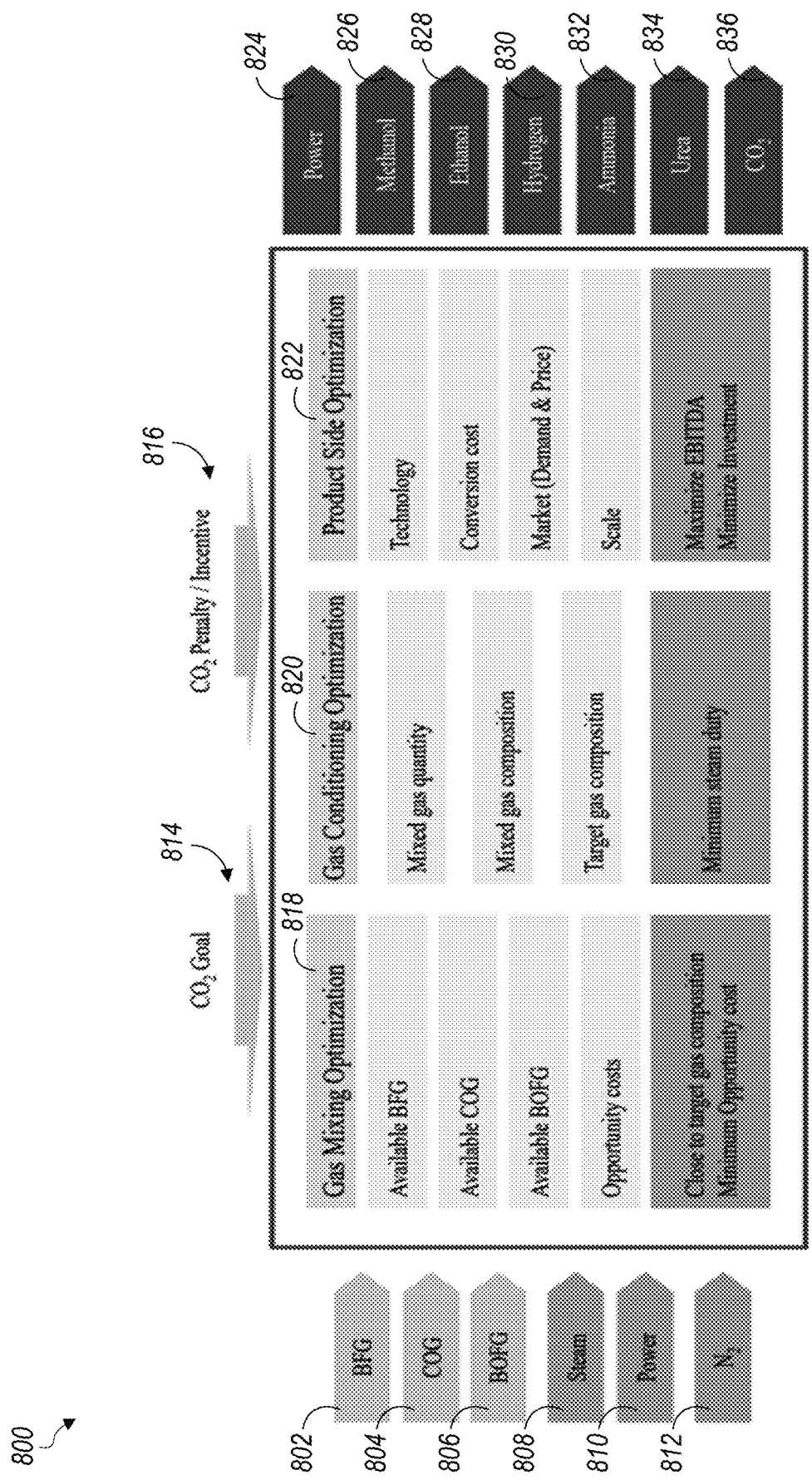
FIG. 8 is a schematic illustration of the optimization framework for a single product according to some aspects.

FIG. 8 is a schematic illustration of the optimization framework 800 for a single product according to some aspects. Referring to FIG. 8, the optimization framework 800 for a single product and its dependencies on all the decision variables and system constraints are illustrated. The optimization framework 800 may be implemented, for example, by the ACS 219 illustrated in FIG. 2. As shown in FIG. 8, the optimization framework 800 may receive BFG 802, COG 804, BOFG 806, steam 808, power 810, and nitrogen ($N_2$) 812. The optimization framework 800 may also receive a $CO_2$ goal 814 and inputs including $CO_2$ penalties and incentives 816. The optimization framework 800 may utilize gas mixing optimization 818 using available BFG, COG, BOFG, opportunity cost, and close to target gas composition minimum opportunity cost, gas conditioning optimization 820 using mixed gas quantity, mixed gas composition, target gas composition, and minimum steam duty, and product side optimization 822 using technology, conversion costs, market (demand and price), scale, and maximum EBITDA/minimum investment.

The optimization framework 800 may output power 824, methanol 826, ethanol 828, hydrogen 830, ammonia 832, urea 834, and $CO_2$ 836. While the availability, flow rate, temperature, pressure, chemical composition of the source gases (BFG/BOFG/COG) are hard constraints (unlikely to be altered), the market demand and product prices, $CO_2$ demand for sequestration/EOR and $CO_2$ incentive/penalty are external factors beyond the system battery limits. Soft constraints can be addressed in the process (pressure, temperature, toxic gaseous components such as SOx, NOx emissions) or can be supplied from the CHP (steam and power).

In order to maximize the profitability (individual product), gas mixing may be performed in a way such that the mixed gas has a composition, flow rate, temperature and pressure that may be closest to that of the target gas:
(a) minimum opportunity cost of energy from these gases which are used in plant heating, auxiliaries etc.;
(b) minimum steam duty requirement during water gas shift reactions (or gas conditioning);
(c) maximization of Product EBITDA; and
(d) minimization of Product Investment.

For the optimization framework, the parameters may include all dependencies on all the decision variables and constraints for production of multiple products simultaneously. The overall basis of the multivariate optimization model for an integrated system design may include maximization of:

$$\text{EBITDA} = \Sigma[(\text{Product vol.})(\text{Product Price} - \text{CoP})] + \\ [(\text{Power Generation})(\text{Power Price} - \text{CoP})] \quad \text{(Eq. 13)}$$

$$CO_2 \text{ incentive} = CO_2 \text{ Sequestrated (or used for EOR)} \times \\ \text{Incentive per tonne (USA)} \quad \text{(Eq. 14)}$$

The overall basis of the multivariate optimization model for an integrated system design may also include minimization of:

$$\text{Investment} = \Sigma \text{Investment of Individual Facilities;} \\ f(\text{Capacity}, \text{Technology}, \text{Supplier}) \quad \text{(Eq. 15)}$$

$$CO_2 \text{ penalty} = (CO_2 \text{ emitted} - CO_2 \text{ target}) \times \text{penalty per tonne} \quad \text{(Eq. 16)}$$

where EBITDA is Earnings before Interest, Taxes, Depreciation and Amortization, CoP is the cost of production, and EOR is enhanced oil recovery.

Figure 9:
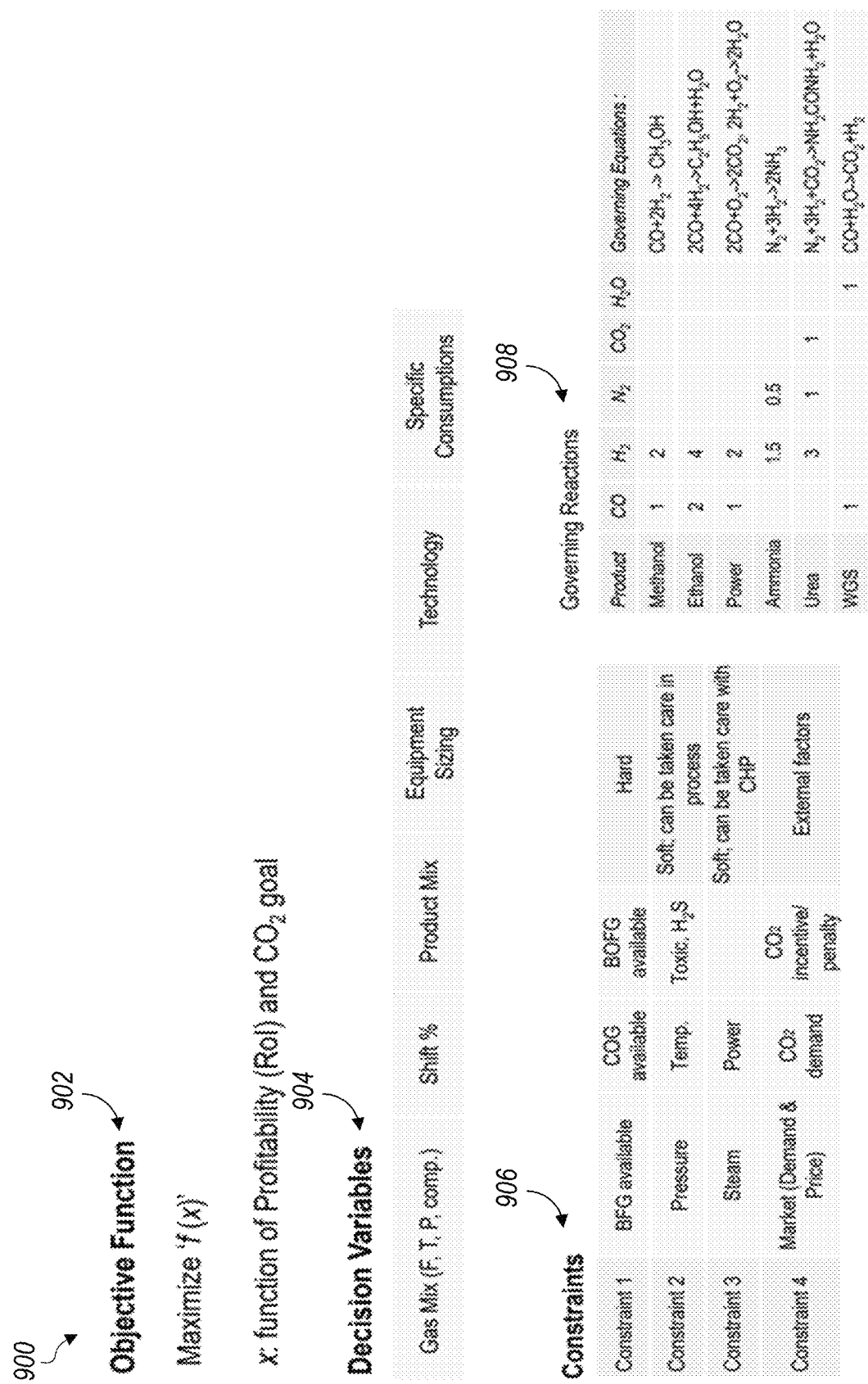
FIG. 9 is a schematic illustration of parameters for an optimizing framework according to some aspects.

FIG. 9 is a schematic illustration of parameters 900 for an optimizing framework according to some aspects. The parameters 900 may be used for an optimizing frame including the CCUS system 200 illustrated in FIG. 2. In some aspects, the parameters 900 may utilized by the ACS 219 illustrated in FIG. 2. As shown in FIG. 9, the parameters 900 may include objective function 902, decision variables 904, constraints 906, and governing reactions 908. In some aspects, the objective function 902 may include maximizing a function (e.g., f(x) max). For example, the objective function 902 may include maximizing profitability (ROI) and/or an amount of $CO_2$ output. In another aspects, an objective function 902 may include minimizing a function (e.g., f(x) min). For example, the objective function 902 may include minimizing tax liability and/or an amount of waste output. In some aspects, the decision variables 904 may include a flow rate of a gas mixture, a temperature of a gas mixture, a pressure of a gas mixture, a composition of a gas mixture, a shift percentage, a product mix, equipment sizing, one or more technologies, one or more specific consumptions.

In some aspects, the constraints 906 may include a plurality of constraints. For example, the plurality of constraints may include a first set of constraints such as an available amount of BFG, an available amount of COG, and an available amount of BOFG. As another example, the plurality of constraints may include a second set of constraints such as pressure, temperature, and toxic $H_2S$. As another example, the plurality of constraints may include a third set of constraints such as steam, and power. As another example, the plurality of constraints may include a fourth set of constraints such as market demand and price, $CO_2$ demand, and $CO_2$ incentives and penalties.

Figure 10:
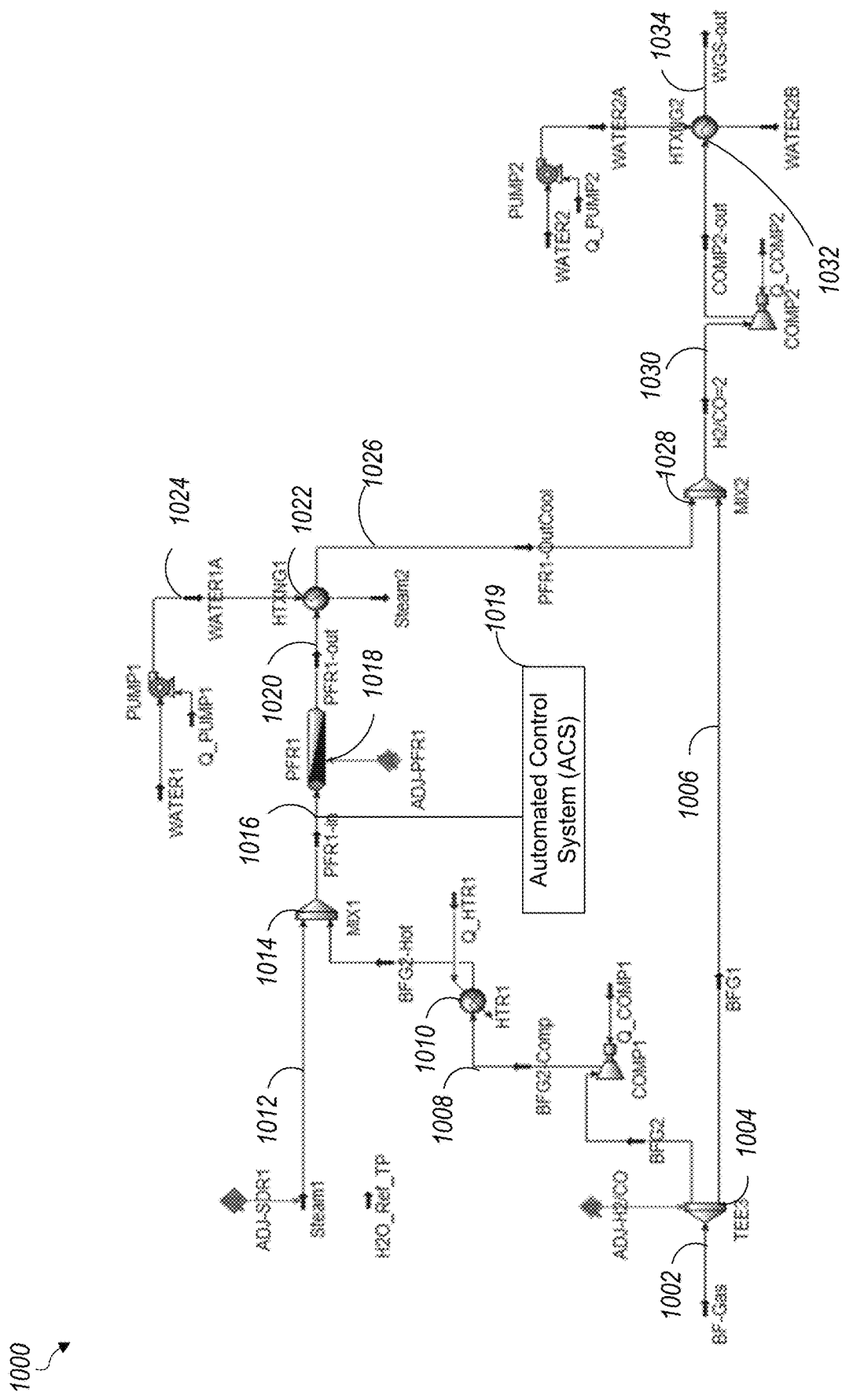
FIG. 10 is a process flow diagrams of a water gas shift scheme system according to some aspects.

In some aspects, the governing reactions 908 may include:

$CO+2H_2 \Rightarrow CH_3OH$;   for methanol:

$2CO+4H_2 \Rightarrow C_2H_5OH+H_2O$;   for ethanol:

$2CO+O_2 \Rightarrow 2CO_2, 2H_2+O_2 \Rightarrow 2H_2O$;   for power:

$N_2+3H_2 \Rightarrow 2NH_3$;   for ammonia:

$N_2+3H_2+CO_2 \Rightarrow NH_2CONH_2+H_2O$; and   for urea:

$CO+H_2O \Rightarrow CO_2+H_2$.   for water gas shifting:

FIG. 10 is a schematic illustration of a water gas shift process system 1000 according to some aspects. The water gas shift process system 1000 may include one or more components of the CCUS system 200 illustrated in FIG. 2. The water gas shift process system 1000 may include an ACS 1019 for commanding the flow controllers, mixers, WGSRs, and other components of the water gas shift process system 1000. For example, the ACS 1019 may include one or more same or similar features of the ACS 219 illustrated in FIG. 2. As shown in FIG. 10, the water gas shift process system 1000 may include a BF gas inlet channel 1002 providing BF gas into the water gas shift process system 1000. At the inlet flow splitting section 1004, the BF gas entering the water gas shift process system 1000 may be split into a bypass BF gas channel 1006 and a system BF gas channel 1008. The ACS 1019 may control the inflow splitting section 1004 to control the flow of BF gas to each of the bypass BF gas channel 1006 and the system BF gas channel 1008.

Along the system BF gas channel 1008, a BF gas channel flow valve 1010 may control the flow of BG gas through the system BF gas channel 1008. The ACS 1019 may command the BF gas channel flow valve 1010 to control the flow of BF gas through the system BF gas channel 1008. The system BF gas channel 1008 may transport BF gas to the first mixer 1014 which combines the BF gas from the system BF gas channel 1008 with steam from the inlet steam channel 1012. After combining the BF gas from the system BF gas channel 1008 with steam from the inlet steam channel 1012, the first mixer 1014 may produce a BF gas and steam gas mixture for communication through a plug flow reactor (PFR) inlet flow channel 1016 to the PFR 1018. The PFR 1018 may be the same as or at least similar to the WGSR 222 illustrated in FIG. 2. In some aspect the PFR 1018 may be a low temperature reactor. A PFR outlet flow channel 1020 may receive $CO_2$ and syngas from the PFR 1018 and transport the $CO_2$ and syngas to the PFR outlet flow controller 1022. The PFR outlet flow controller 1022 may control the flow of the $CO_2$ and syngas from the PFR outlet flow channel 1020 and water from the water inlet channel 1024. The PFR outlet flow controller 1022 may control the flow of steam out of the system 1000 and the combined $CO_2$ and syngas from the PFR outlet flow channel 1020 and water from the water inlet channel 1024 in a cooled form into the combined PFR outlet flow channel 1026. The combine PFR outlet from channel 1026 transports the combined $CO_2$ and syngas and water in cooled form to a second mixer 1028 for mixing with BF gas from the bypass BF gas channel 1006. After mixing, the second mixer 1028 sends at least CO and $H_2$ through the second mixer outlet channel 1030, via a compressor, to a system outlet flow controller 1032 for mixing at least the CO and $H_2$ with water and to control the flow of the CO, $H_2$, and water to the system outlet channel 1034.

In some aspects, the BF gas at the BF gas inlet channel 1002 may have several parameters including 30 degrees Celsius, 0.3 barg, 475,000 $Nm^3$/hour (43,857 mmbtu/d). A composition of the BF gas at the BF gas inlet channel 1002 may include 22.6% CO, 22.4% $CO_2$, 9.5% $H_2$, 0% $H_2O$, and 45.5% $N_2$. In some aspects, the steam at the inlet steam channel 1012 may have several parameters including 160 degrees Celsius, 2.4 barg and the reaction gas (e.g., steam) at the PFR inlet flow channel 1016 may include 160 degrees Celsius, 2.4 barg. In some aspects, the gas at the PFR outlet flow channel 1026 may have several parameters including 110 degrees Celsius and 0.3 barg. A composition of the gas at the PFR outlet flow channel 1026 may include 2.8% CO, 31.6% $CO_2$, 21.7% $H_2$, 9.2% $H_2O$, and 34.7% $N_2$. In some aspects, a composition of the gas at the second mixer outlet channel 1030 may include 8.9% CO, 28.7% $CO_2$, 18% $H_2$, 6.4% $H_2O$, and 38.1% $N_2$. In some aspects, the gas at the system outlet channel 1034 may have several parameters including 40 degrees Celsius, 1.0 barg, 568,000 $Nm^3$/hour (39.581 mmbtu/d). A composition of the gas at the system outlet channel 1034 may include 8.9% CO, 28.7% $CO_2$, 18% $H_2$, 6.4% $H_2O$, and 38.1% $N_2$. In some aspects, only 1-liter WGSR may be sufficient for the CO conversion that may be used herein. An inlet temperature of 160 degrees Celsius may be need for catalytic activity. Feed BFG may be heated to 160 degrees Celsius while $T_{steam}$ may be 160 degree Celsius. Feed BFG and steam may be compressed to 2.4 barg to account for downstream pressure drop. In some aspects, a pressure drop across the PFR may be 2.0 bar and the heat exchange 0.1 bar.

FIG. 11 is an illustration indicating steam conditions for water gas shift process configurations 1100 according to some aspects. The water gas shift process configurations 1100 may indicate a set of conditions for the water gas shift process system 1000 of FIG. 10, when, for example, the bypass BF gas channel 1006 receives 32% of the BF gas flow from the BF gas inlet channel 1002.

Figure 12:
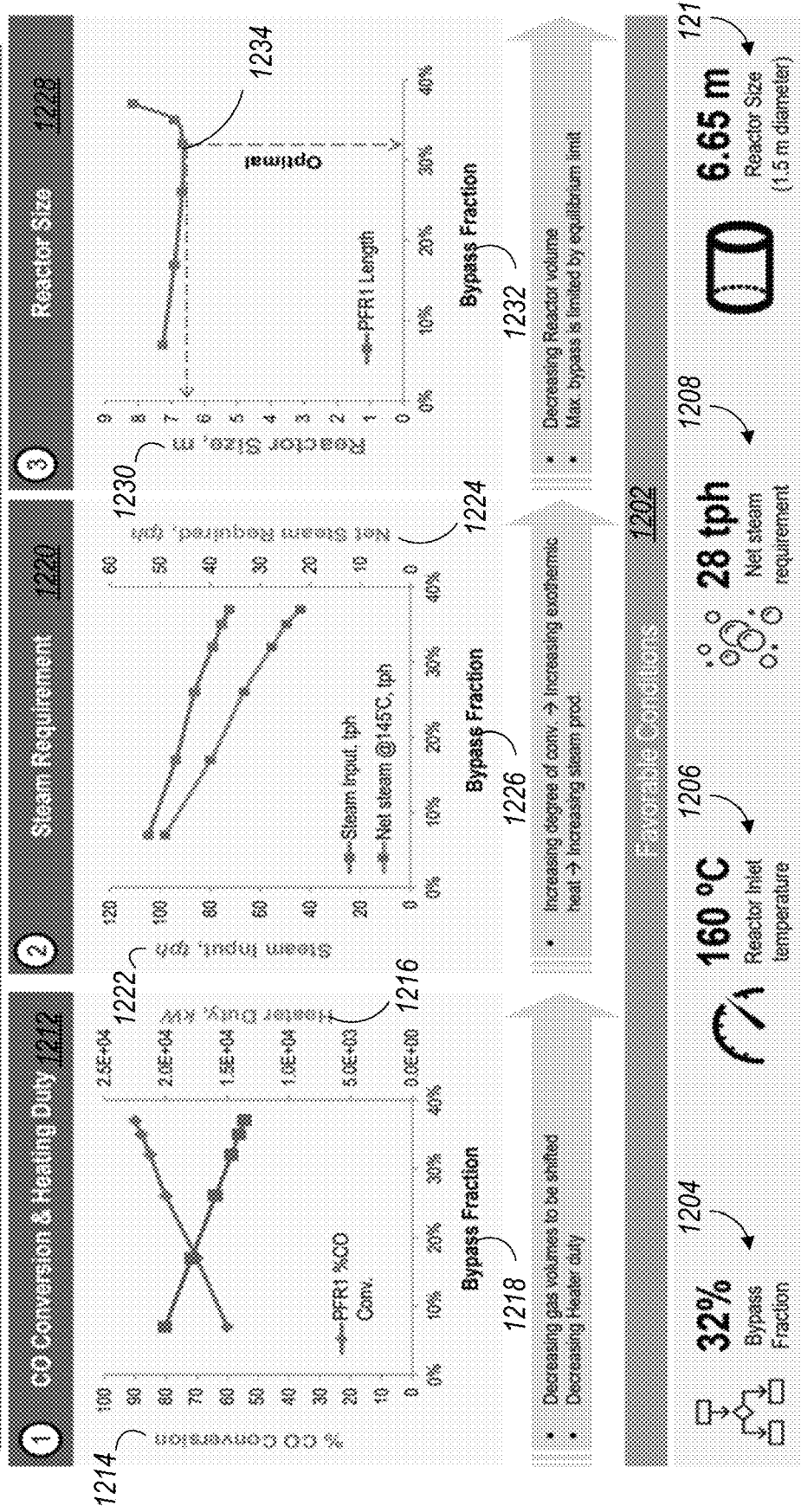
FIG. 12 is an illustration indicating output data for water gas shift process configurations according to some aspects.

FIG. 12 is an illustration indicating output data 1200 for water gas shift process configurations according to some aspects. The output data 1200 may be for the water gas shift process 1000 of FIG. 10 under the following favorable conditions 1002 including when the bypass BF gas channel 1006 receives 32% of the BF gas flow from the BF gas inlet channel 1002 1204, when the BF gas and steam gas mixture communicating through the PFR inlet flow channel 1016 to the PFR 1018 is about 160 degree Celsius 1206, when the flow rate of steam through the inlet steam channel 1012 is about 28 tonnes per hour 1208, and when the PFR 1018 has a size of about 6.65 meters with about a 1.5 meter diameter 1210.

Under the above favorable conditions 1202, the water gas shift process 1000 of FIG. 10 may have several characteristics. For example, for CO conversion and heating duty 1212, for the PFR inlet flow channel 1016 to the PFR 1018 and the PFR outlet flow channel 1026 from the PFR 1018, the percentage of CO conversion 1214 increases and the heater duty in kilowatts 1216 increases as the percent of BF gas through the bypass BF gas channel 1006 1218 increases. As another example, for steam requirements 1220, with regards to either the flow rate of steam through the inlet steam channel 1012 or net steam at 145 degrees Celsius through the PFR 1018, the steam input 1222 and the net steam required 1224 decreases as the percent of BF gas through the bypass BF gas channel 1006 1226 increases. As another example, for PFR size in meters 1228 (e.g., PFR 1018 of FIG. 10), the reactor size 1230 decreases as the percent of BF gas through the bypass BF gas channel 1006 1232 increases until the reactor size 1230 reaches a minimum 1234 which may be determinative of an enhanced (e.g., optimal) percent of BF gas through the bypass BF gas channel 1006. In this case, the enhanced percentage of BF gas through the bypass BF gas channel 1006 may be about 32%.

Figure 13:
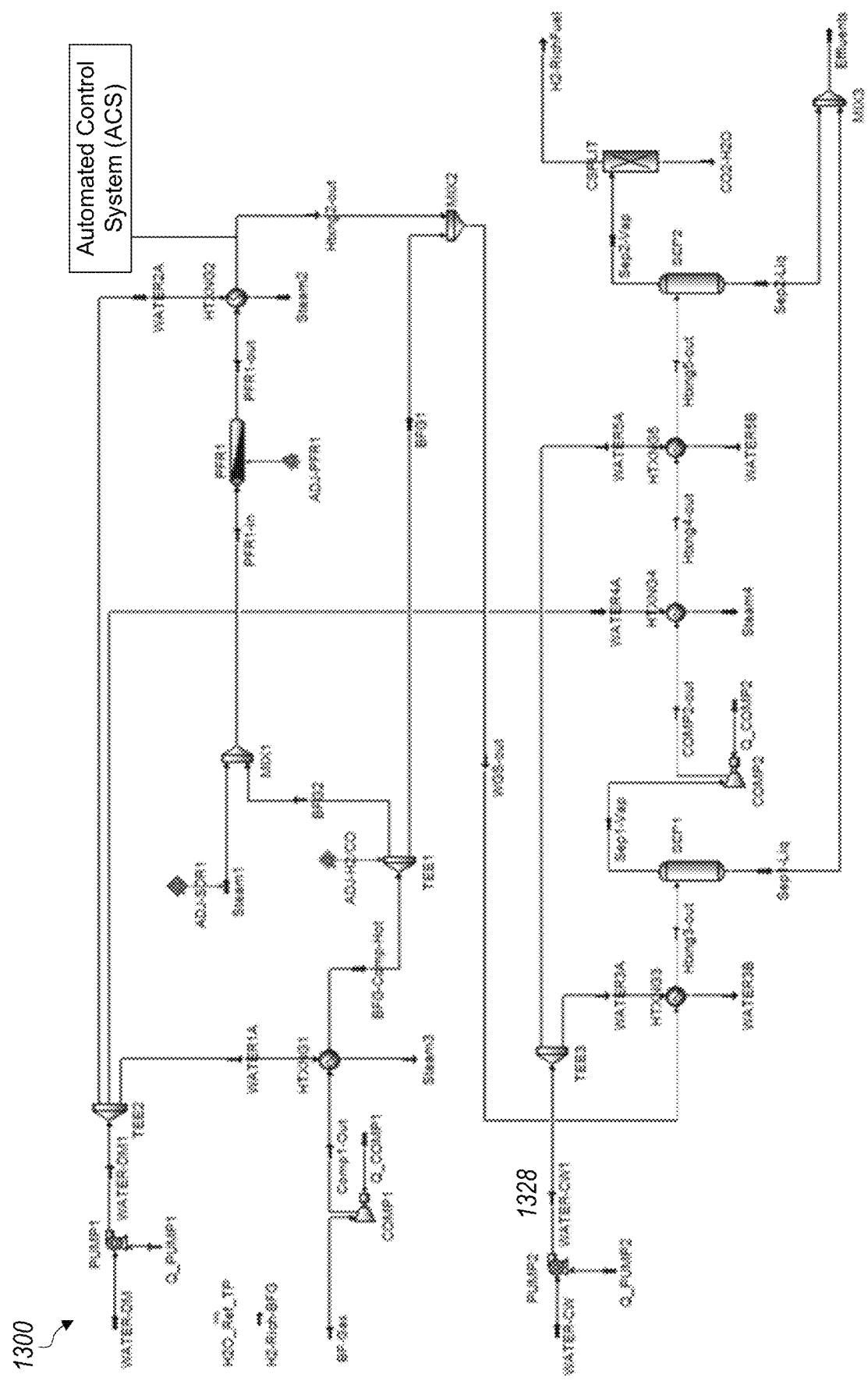
FIG. 13 is a process flow diagram of another water gas shift process system according to some aspects.

FIG. 13 is a schematic illustration of another water gas shift process system 1100 according to some aspects. The water gas shift process system 1100 may include one or more components of the CCUS system 200 illustrated in FIG. 2 and the water gas shift process system 1000 illustrated in FIG. 10. In some aspects, the PFG of the water gas shift process system 1100 may be a low temperature reactor. The water gas shift process system 1300 may include an ACS for commanding the flow controllers, mixers, WGSRs, and other components of the water gas shift process system 1000. For example, the ACS may include one or more same or similar features of the ACS 219 illustrated in FIG. 2 and the ACS 1019 illustrated in FIG. 10. As shown in FIG. 13, the water gas shift process system 1300 may include a BF gas inlet channel providing BF gas into the water gas shift process system 1300. At the inlet flow splitting section, the BF gas entering the water gas shift process system may be split into a bypass BF gas channel and a system BF gas channel. The ACS may control the inflow splitting section to control the flow of BF gas to each of the bypass BF gas channel and the system BF gas channel.

Along the system BF gas channel, a BF gas channel flow valve may control the flow of BG gas through the system BF gas channel. The ACS may command the BF gas channel flow valve to control the flow of BF gas through the system BF gas channel. The system BF gas channel may transport BF gas to the first mixer which combines the BF gas from the system BF gas channel with steam from the inlet steam channel. After combining the BF gas from the system BF gas channel with steam from the inlet steam channel, the first mixer may produce a BF gas and steam gas mixture for communication through a plug flow reactor (PFR) inlet flow channel to the PFR. The PFR may be the same as or at least similar to the WGSR 222 illustrated in FIG. 2. A PFR outlet flow channel may receive $CO_2$ and syngas from the PFR and transport the $CO_2$ and syngas to the PFR outlet flow controller. The PFR outlet flow controller may control the flow of the $CO_2$ and syngas from the PFR outlet flow channel and water from the water inlet channel. The PFR outlet flow controller may control the flow of steam out of the system and the combined $CO_2$ and syngas from the PFR outlet flow channel and water from the water inlet channel in a cooled form into the combined PFR outlet flow channel. The combine PFR outlet from channel transports the combined $CO_2$ and syngas and water in cooled form to a second mixer for mixing with BF gas from the bypass BF gas channel. After mixing, the second mixer sends at least CO and $H_2$ through the second mixer outlet channel, via a compressor, to a system outlet flow controller for mixing at least the CO and $H_2$ with water and to control the flow of the CO, $H_2$, and water to the system outlet channel. The CCUS system 1300 may have a PFR inlet temperature of 160 degrees Celsius, a net steam use of 40 tonnes per hour, and a PFR size of 6.0 meters (1.5-meter diameter).

FIG. 14 is an illustration indicating steam conditions 1400 for water gas shift process configurations 1300 according to some aspects. The water gas shift process configurations 1300 may indicate a set of conditions for the water gas shift process system 1300 of FIG. 13, when, for example, the bypass BF gas channel 1006 receives 32% of the BF gas flow from the BF gas inlet channel 1002.

Figure 15:
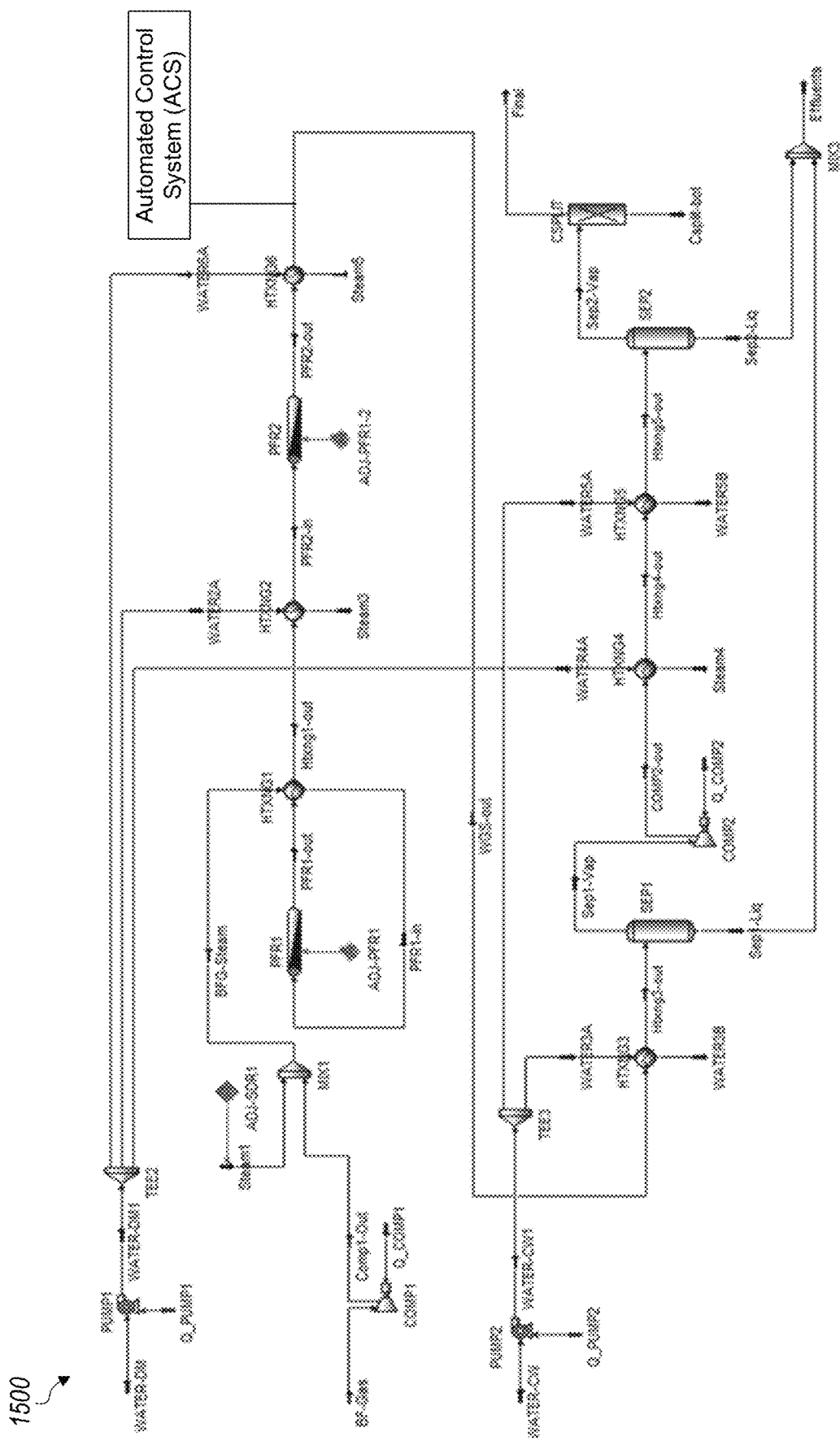
FIG. 15 is a process flow diagram of yet another water gas shift process system according to some aspects.

FIG. 15 is a schematic illustration of yet another water gas shift process system 1500 according to some aspects. The water gas shift process system 1100 may include one or more components of the CCUS system 200 illustrated in FIG. 2 and the water gas shift process system 1000 illustrated in FIG. 10. In some aspects, the water gas shift process system 1500 may include two or more PFRs (e.g., at least one high temperature reactor and at least one low temperature reactor). The water gas shift process system 1500 may include an ACS for commanding the flow controllers, mixers, WGSRs, and other components of the water gas shift process system 1000 and 1300. For example, the ACS may include one or more same or similar features of the ACS 219 illustrated in FIG. 2 and the ACS 1019 illustrated in FIG. 10. As shown in FIG. 15, the water gas shift process system 1500 may include a BF gas inlet channel providing BF gas into the water gas shift process system 1500. At the inlet flow splitting section, the BF gas entering the water gas shift process system may be split into a bypass BF gas channel and a system BF gas channel. The ACS may control the inflow splitting section to control the flow of BF gas to each of the bypass BF gas channel and the system BF gas channel.

Along the system BF gas channel, a BF gas channel flow valve may control the flow of BG gas through the system BF gas channel. The ACS may command the BF gas channel flow valve to control the flow of BF gas through the system BF gas channel. The system BF gas channel may transport BF gas to the first mixer which combines the BF gas from the system BF gas channel with steam from the inlet steam channel. After combining the BF gas from the system BF gas channel with steam from the inlet steam channel, the first mixer may produce a BF gas and steam gas mixture for communication through a plug flow reactor (PFR) inlet flow channel to the PFR. The PFR may be the same as or at least similar to the WGSR 222 illustrated in FIG. 2. A PFR outlet flow channel may receive $CO_2$ and syngas from the PFR and transport the $CO_2$ and syngas to the PFR outlet flow controller. The PFR outlet flow controller may control the flow of the $CO_2$ and syngas from the PFR outlet flow channel and water from the water inlet channel. The PFR outlet flow controller may control the flow of steam out of the system and the combined $CO_2$ and syngas from the PFR outlet flow channel and water from the water inlet channel in a cooled form into the combined PFR outlet flow channel. The combine PFR outlet from channel transports the combined $CO_2$ and syngas and water in cooled form to a second mixer for mixing with BF gas from the bypass BF gas channel. After mixing, the second mixer sends at least CO and $H_2$ through the second mixer outlet channel, via a compressor, to a system outlet flow controller for mixing at least the CO and $H_2$ with water and to control the flow of the CO, $H_2$, and water to the system outlet channel. The CCUS system 1500 may have a high temperature reactor inlet temperature of 350 degrees Celsius, a low temperature reactor inlet temperature of 160 degrees Celsius, a net steam use of 110 tonnes per hour, and a reactor size of 14.0 meters (1.5-meter diameter) and/or 15.0 (1.5-meter diameter).

FIG. 16 is an illustration indicating steam conditions 1600 for water gas shift process configurations 1500 according to some aspects. The water gas shift process configurations 1500 may indicate a set of conditions for the water gas shift process system 1500 of FIG. 15, when, for example, the bypass BF gas channel 1006 receives 32% of the BF gas flow from the BF gas inlet channel 1002.

FIG. 17 is an illustration indicating metrics 1700 for water gas shift process configurations according to some aspects. As shown in FIG. 17, illustrates metrics 1700 for each of the water gas shifting process 1000 of FIG. 10, the water gas shifting process 1300 of FIG. 13, and the water gas shifting process 1500 of FIG. 15. The metrics of FIG. 17 include target 1710, WGSR configuration 1712, a $H_2$ content with $H_2$-rich gas (after $CO_2$ removal) 1714, unshifted fraction 1716, CO conversion 1718, and net stream in tonnes 1720.

FIG. 18 is an illustration indicating steam data 1800 for water gas shift process configurations according to some aspects. The steam data 1800 may be for the water gas shift process 1000 illustrated in FIG. 10. The steam data 1800 may include units 1806, cleaned BF gas 1808, steam to WGSR 1810, shifted gas from WGSR 1812, shifted gas after booster ID fan 1814, $H_2$ rich fuel gas 1816, steam to stripper 1818, $CO_2$ into compressor 1820, and $CO_2$ out from compressor 1822 for each of the stream number field 1824, the gas composition field 1826, the CO field 1828, the $CO_2$ field 1830, the $H_2$ field 1832, the $H_2O$ field 1834, the $N_2$ field 1836, the gas temperature field 1838, the gas pressure field 1840, the $H_2$:CO ratio field 1842, the gas CV field 1844, the gas volume flow rate field 1846, and the mass flow rate field 1848.

FIG. 19 is an illustration indicating output steam compositions 1900 for water gas shift process configurations according to some aspects. The output steam composition 1900 may be for the water gas shift reactor 1300 of FIG. 13 and the water gas shift reactor 1500 of FIG. 15. For each of the water gas shift reactor 1300 of FIG. 13 and the water gas shift reactor 1500 of FIG. 15, the output steam compositions 1900 may include the CO field 1910, the $CO_2$ field 1912, the $H_2$ field 1914, the $H_2O$ field 1916, the methane field 1918, and $N_2$ field 1920, and $N_2S$ field 1922. Each of the CO field 1910, the $CO_2$ field 1912, the $H_2$ field 1914, the $H_2O$ field 1916, the methane field 1918, and $N_2$ field 1920, and $N_2S$ field 1922 may provide a value for each of the water gas shift reactor 1300 of FIG. 13 and the water gas shift reactor 1500 of FIG. 15.

FIG. 20 is an illustration indicating output system parameters 2000 for water gas shift process configurations according to some aspects. The output system parameters 2000 may be for the water gas shift reactor 1000 of FIG. 10, the water gas shift reactor 1300 of FIG. 13, and the water gas shift reactor 1500 of FIG. 15. For each of the water gas shift reactor 1000 of FIG. 10, the water gas shift reactor 1300 of FIG. 13 and the water gas shift reactor 1500 of FIG. 15, the output system parameters 2000 may include the target composition field 2010, the % CO conversation field 2012, the $H_2$ content in $H_2$ rich has (after $CO_2$ removal) field 2014, the unshifted fraction field 2016, the net steam (tph) field 2018, the pump duty (kw) field 2020, the comp power (MW) field 2022, the steam temperature (degrees Celsius) field 2024, the WGS inlet temperature (degrees Celsius) field 2026, the PFR1 outlet temperature (degrees Celsius) field 228, the boiler water (tph) field 2030, the cooler water (tph) field 2032. Each of the target composition field 2010, the % CO conversation field 2012, the $H_2$ content in $H_2$ rich has (after $CO_2$ removal) field 2014, the unshifted fraction field 2016, the net steam (tph) field 2018, the pump duty (kw) field 2020, the comp power (MW) field 2022, the steam temperature (degrees Celsius) field 2024, the WGS inlet temperature (degrees Celsius) field 2026, the PFR1 outlet temperature (degrees Celsius) field 228, the boiler water (tph) field 2030, the cooler water (tph) field 2032 may provide a value for each of the water gas shift reactor 1000 of FIG. 10, the water gas shift reactor 1300 of FIG. 13, and the water gas shift reactor 1500 of FIG. 15. FIG. 20 may provide some of the guiding principles for optimization of a water gas shift system design. The output system parameters 2000 may be for the water gas shift process 21 of FIG. 21 described further herein and under conditions of varying $H_2$/CO and bypass fractions.

Optimization of the envisaged 'Gas conditioning & CO2 capture system' may depend on several factors including:
Downstream Products: Combustion Fuel-mix, Chemicals, CCGT Power, alternative uses in steel plant, etc.
Flow rate, Temperature, Pressure, Composition of Gas Mix (BFG/BOFG/COG; in this case only BFG)
Technology: Type of reactors (HT, LT, combination, catalyst, etc.)
Degree of shift in WGSRs
Equipment Sizing
Utility Consumptions
Emission norms (SOx, NOx & PM).

With so many system variables, it is critical to analyze the behavior of each of them as a function of the control parameters. One of the most important control parameters is the $H_2$/CO ratio of the product gas—which, in turn, is a function of the bypass fraction.

Figure 21:
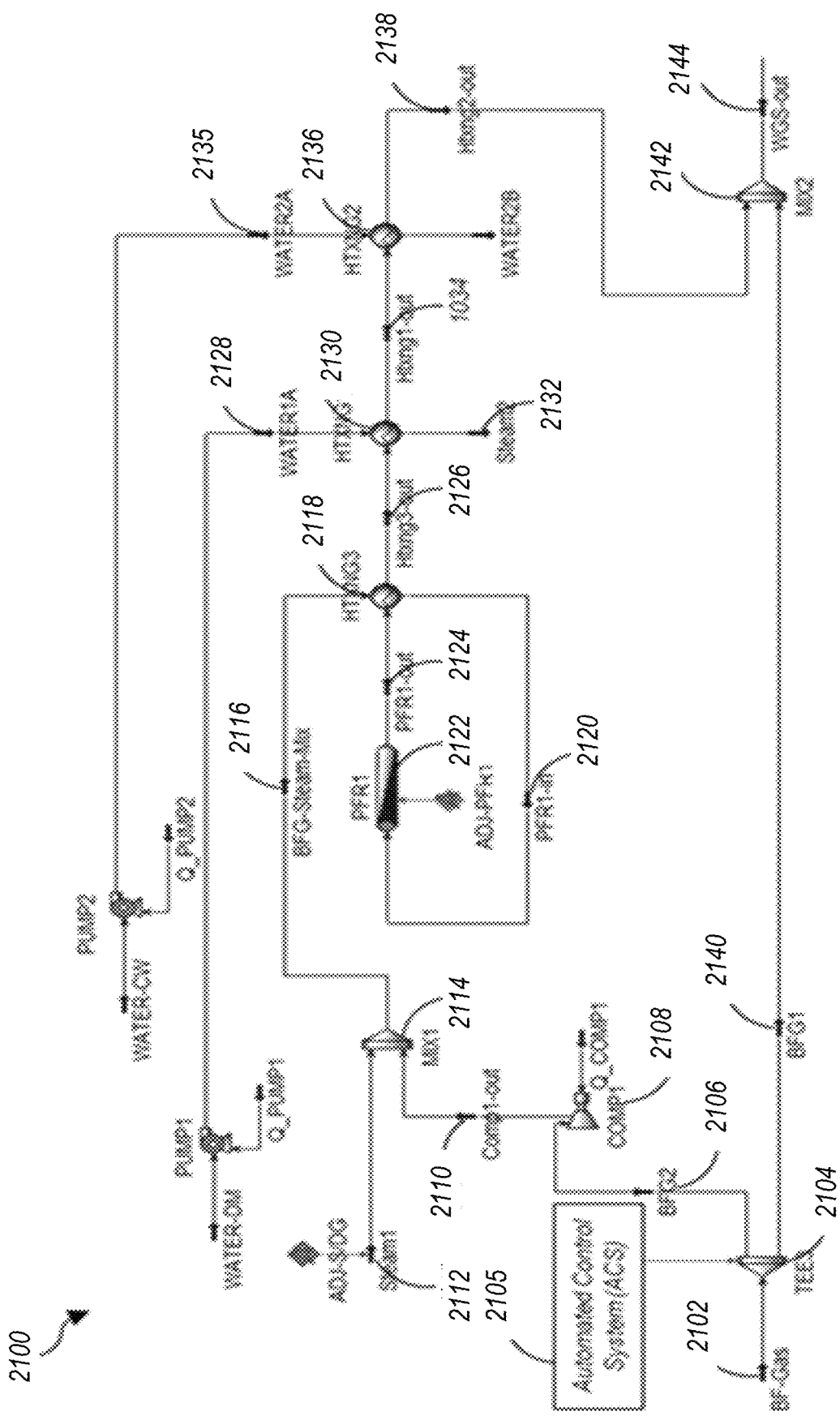
FIG. 21 is a process flow diagram of a water gas shift process system according to some aspects.

There may be multiple potential utilization options for the product gas including but not limited to combustion fuel, production of chemicals (such as methanol, ammonia, urea or hydrogen), and CCGT power determination. However, the most optimal utilization scheme may be determined based on the aforementioned system variables coupled with following site/product specific constraints:
Market demand and/or steel plant demand of products
Utility availability and cost: Steam, Power, Fuel and Water
$CO_2$ incentives/penalty FIG. 21 is a process flow diagram of a water gas shift process system 2100 according to some aspects. The water gas shift process system 2100 may include one or more components of the CCUS system 200 illustrated in FIG. 2. The water gas shift process system 2100 may include an ACS 2119 for commanding the flow controllers, mixers, WGSRs, and other components of the water gas shift process system 2100. For example, the ACS 2119 may include one or more same or similar features of the ACS 219 illustrated in FIG. 2. As shown in FIG. 21, the water gas shift process system 2100 may include a BF gas inlet channel 2102 providing BF gas into the water gas shift process system 2100. At the inlet flow splitting section 2104, the BF gas entering the water gas shift process system 2100 may be split into a bypass BF gas channel 2140 and a system BF gas channel 2106. The ACS 2105 may control the inflow splitting section 2104 to control the flow of BF gas to each of the bypass BF gas channel 2140 and the system BF gas channel 2106.

The system BF gas 2106 may be compressed by a compressor 2108 to a pressure that may be same as the steam 2112 and that may be sufficient to overcome the total pressure drop, downstream. The compressed system BF gas 2110 may mix with steam 2112 by the mixer 2114. The mixture of steam and system BF gas 2116 may be heated by a heat exchanger 2118 and may be fed into a Plug Flow Reactor (PFR) that may be the same as or at least similar to the WGSR 222 illustrated in FIG. 2. Exothermic chemical reactions in the PFR 2122 may raise the temperature of the product gas significantly. The system BF gas and steam mix 2116 may cool down the heated product gas (syngas) in the heat exchanger 2118 and may get pre-heated itself to 350 deg Celsius. Further, water from the water inlet channels 2128 and 2135 may cool down the product gas (syngas) in the heat exchangers 2130 and 2136 and may generate steam in the process. After passing through the heat exchangers 2118, 2130 and 2136, the hot process gas from the PFR may cool down to 40 deg Celsius. The heat exchanger 2130 produce steam 2132 at 4.1 bar absolute pressure and 145 deg Celsius. The cooled shifted gas 2138 may mix with the bypass BF gas by a mixer 2142 that may achieve the gas with the desired $H_2/CO$ ratio of 2.0.

Figure 22:
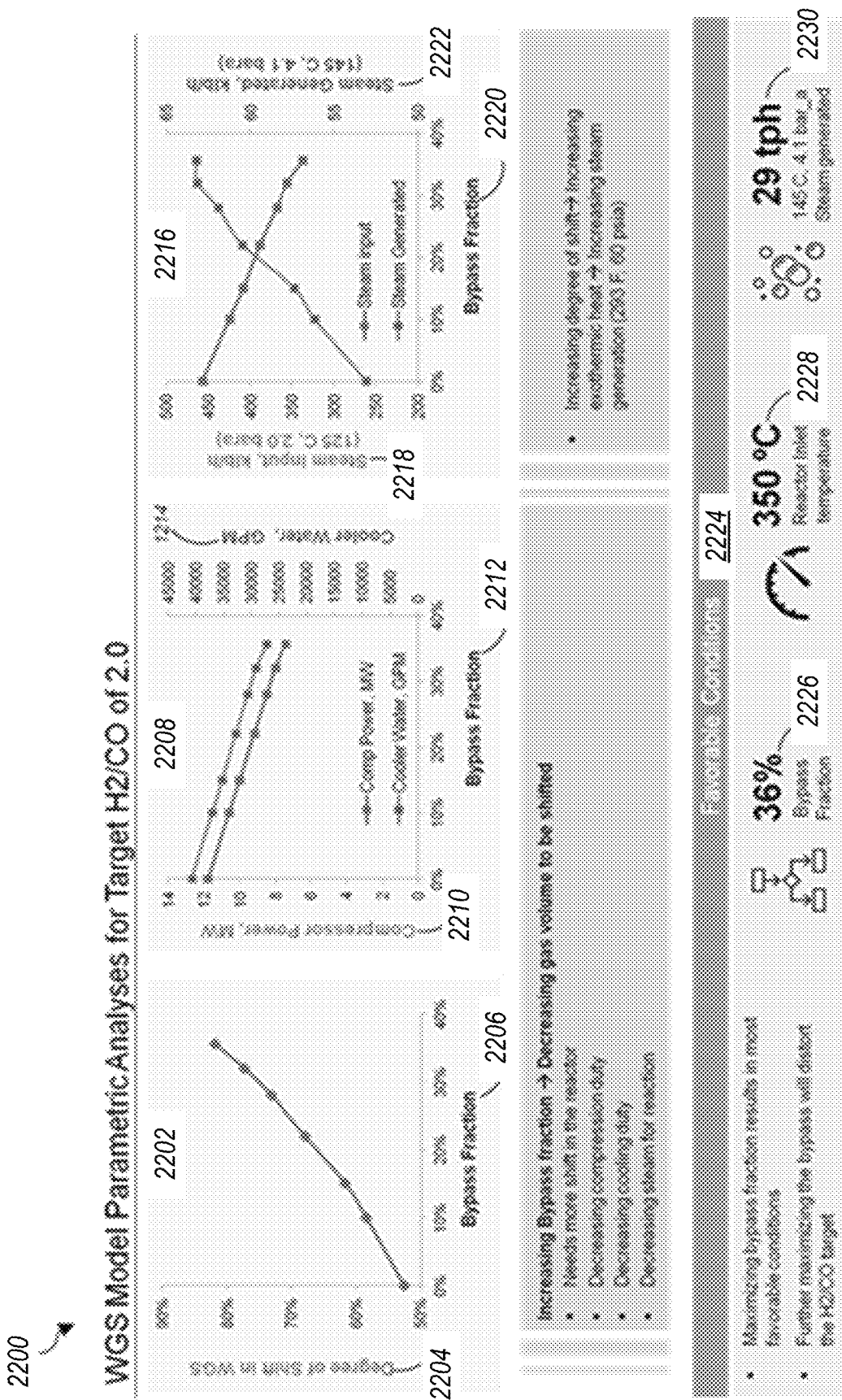
FIG. 22 is an illustration indicating parametric analysis for water gas shift process configurations according to some aspects.

FIG. 22 is an illustration indicating parametric analysis 2200 for water gas shift process configurations according to some aspects. The output data 2200 may be for the water gas shift process 2100 of FIG. 21 under the following favorable conditions 2224 including when the bypass BF gas channel 2140 receives 36% of the BF gas flow from the BF gas inlet channel 2102 2226, when the BF gas and steam gas mixture communicating through the PFR inlet flow channel 2120 to the PFR 2122 is about 350-degree Celsius 2228 and when steam generated through channel 2124 is about 29 tonnes per hour 2230.

The water gas shift process 2100 of FIG. 21 may have several characteristics. For example, degree of shift in WGS, for the PFR inlet flow channel 2120 to the PFR 2122 and the PFR outlet flow channel 2124 from the PFR 2122, the degree of shift in WGS 2204 increases. As another example 2208, the compressive power 2210 and cooler water 2214 decrease with bypass fraction 2212. As another example 2216, the steam input 2218 decreases with the bypass fraction 2220 and the steam generated 2222 decreases with the bypass fraction 2220.

FIG. 23 is an illustration indicating metrics 2300 for water gas shift process configurations according to some aspects and corresponds to process 2100 of FIG. 21. The metrics 2300 may include target $H_2$-rich gas composition 2310, WGSR configuration 2312, a $H_2$ content with $H_2$-rich gas (after $CO_2$ removal) 2314, bypass fraction 2316, CO conversion 2318, net steam generation in tonnes per hour 2320 and compression duty 2322.

Figure 24:
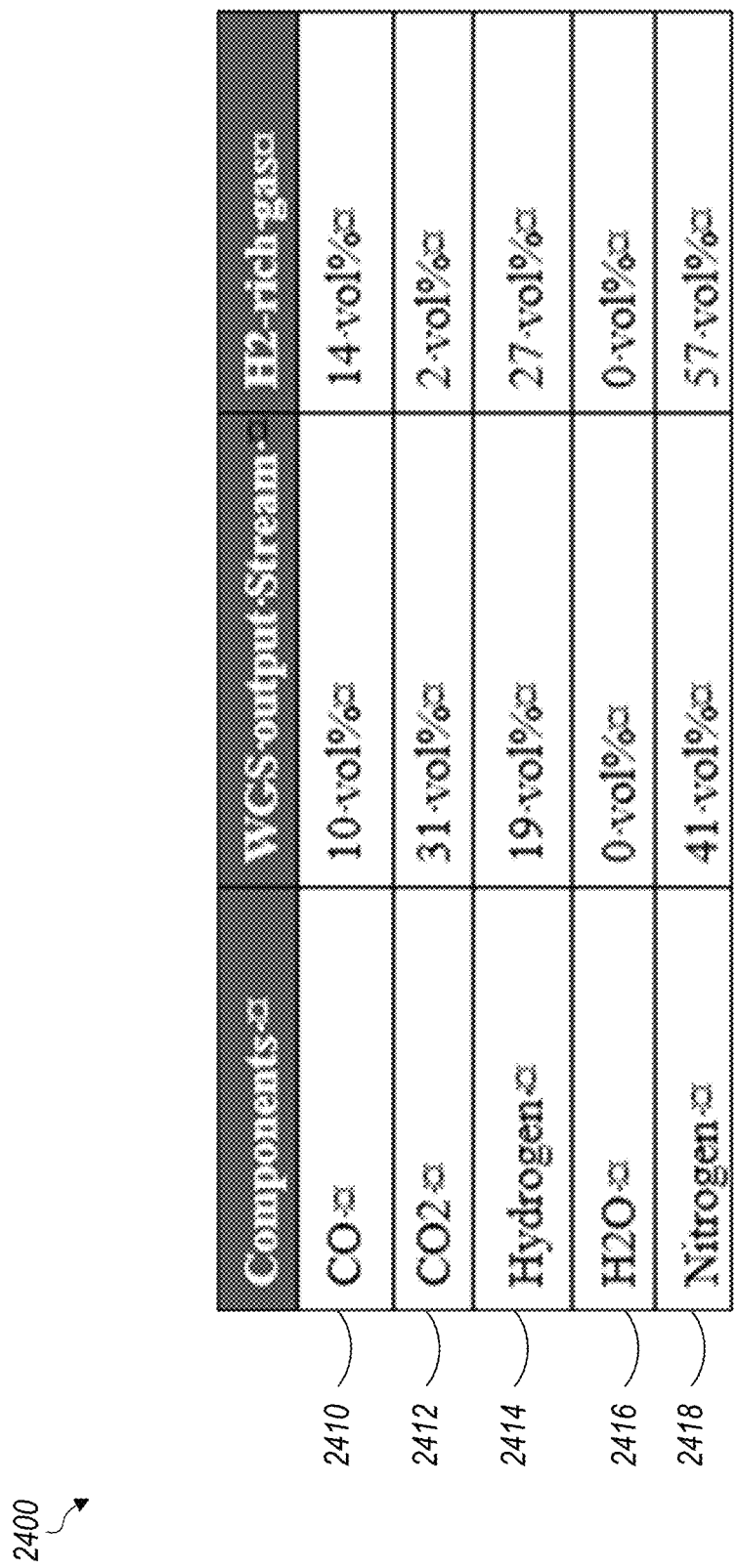
FIG. 24 is an illustration indicating WGS output stream compositions for water gas shift process configurations according to some aspects.

FIG. 24 is an illustration indicating WGS output stream compositions 2400 for water gas shift process configurations according to some aspects. The WGS output stream composition 2400 may be for the water gas shift reactor 2100 of FIG. 21. The WGS output stream composition 2400 may include the CO field 2410, the $CO_2$ field 2412, the $H_2$ field 2414, the $H_2O$ field 2416, and $N_2$ field 2418. Each of the CO field 2410, the $CO_2$ field 2412, the $H_2$ field 2414, the $H_2O$ field 2416 and $N_2$ field 2418 may provide a value for each of the water gas shift reactor 2100 of FIG. 21.

Figure 25:
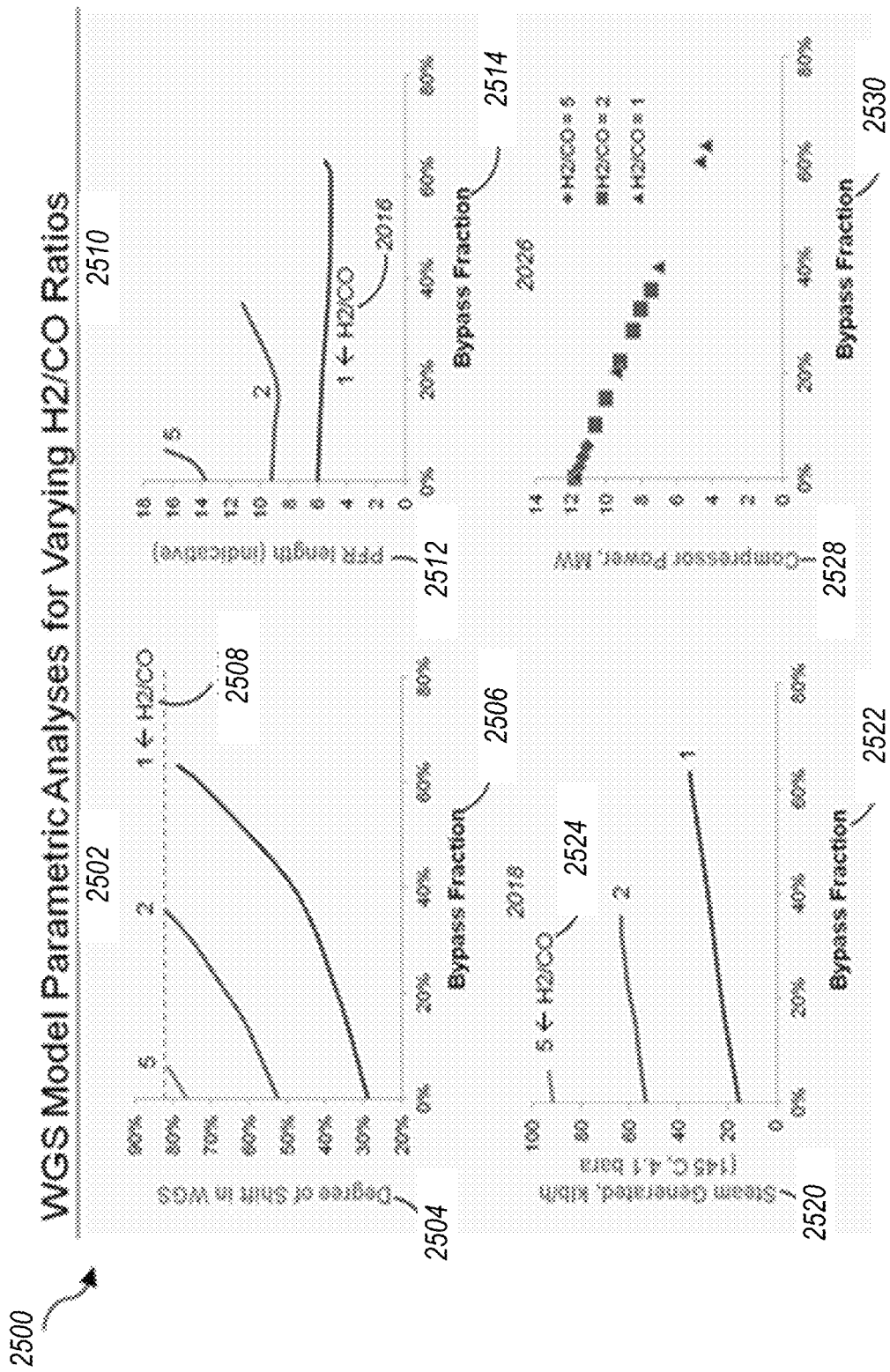
FIG. 25 illustrates the various effects of the parameter, $H_2/CO$ ratio that may be varied from 1 to 5 to accommodate the possibility of generation of various downstream products.

FIG. 25 illustrates the various effects of the parameter, $H_2/CO$ ratio that may be varied from 1 to 5 to accommodate the possibility of generation of various downstream products. As shown in example 2502, the $H_2/CO$ ratio may increase the minimum degree of shift and may decrease the maximum bypass fraction. As shown in example 2510, the $H_2/CO$ ratio may increase the size of the PFR 2512 as more residence time may be required to attain higher degree of shift. As shown in example 2518, the $H_2/CO$ ratio may increase the steam generation 2520 as more exothermic heat may be generated with higher degree of shift. As shown in example 2526, the $H_2/CO$ ratio, however, may not have an effect on the compression power 2528 as the latter may be dependent only the volume gas to be shifted.

The present disclosure is not necessarily limited to the example embodiments embodiment described herein. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A system for capturing and utilizing carbon dioxide ($CO_2$) of one or more gases from one or more plants, comprising:
a system gas flow inlet channel configured to receive the one or more gases from the one or more plants, wherein the one or more gases comprise at least carbon monoxide (CO) and water vapor;
a plug flow reactor (PFR) configured to receive a first fraction of the one or more gases and convert the one or more gases to $CO_2$ and hydrogen ($H_2$);
a bypass channel configured to receive a second fraction of the one or more gases so that the second fraction of the one or more gases bypasses the PFR and combines the second fraction of the one or more gases with the $CO_2$ and $H_2$ from the PFR to form $CO_2$ and syngas;
a $CO_2$ capture unit configured to receive the $CO_2$ and the syngas and separate the $CO_2$ from the syngas for compression, distribution, storage, and other uses of the $CO_2$;
one or more flow controllers configured to modulate the first fraction and the second fraction; and
an automated control system (ACS) configured to:
determine one or more parameters of at least one gas of the one or more gases through the system gas flow inlet channel, the first fraction of the one or more gases, the second fraction of the one or more gases, the $CO_2$ flowing into the $CO_2$ capture unit, or the syngas flowing into the $CO_2$ capture unit, and
command the one or more flow controllers to modulate at least one of the first fraction or the second fraction based on the one or more parameters and at least one of a predetermined amount of $CO_2$ or a predetermined amount of syngas.

2. The system of claim 1, wherein the ACS is further configured to command the one or more flow controllers to modulate the first fraction and the second fraction based on a cost model that utilizes a cost function to derive a cost based on a total system cost loss.

3. The system of claim 1, wherein the one or more gases comprise at least one of blast furnace gas (BFG), basic oxygen furnace gas (BOFG), or coke oven gas (COG).

4. The system of claim 1, wherein the PFR comprises at least one water gas shift reactor (WGSR).

5. The system of claim 1, wherein the syngas comprises at least one of rich carbon monoxide (CO) and $H_2$ or $N_2$.

6. The system of claim 1, wherein the one or more parameters comprises at least one of a flow rate, a temperature, a pressure, a fuel utilization, or a chemical composition.

7. The system of claim 1, wherein at least one of the first fraction or the second fraction comprises a volumetric flow rate of the one or more gases.

8. The system of claim 1, wherein the one or more plants comprise at least one of a blast furnace, a basic oxygen furnace, or a coke oven.

9. The system of claim 1, wherein the $CO_2$ separated by $CO_2$ capture unit is compressed and transported for at least one of $CO_2$ storage, enhanced oil recovery (EOR), methanol, polycarbonates, concrete curing, mineral aggregates, or beverage carbonation.

10. The system of claim 1, wherein the syngas is separated by the $CO_2$ capture unit to produce at least one of methanol, ethanol, hydrogen, ammonia, urea, or power.

11. The system of claim 1, further comprising:
one or more sensors, wherein at least one sensor of the one or more sensors measures at least one parameter of the one or more parameters associated with at least one of the system gas flow inlet channel, the PFR, the bypass channel, the one or more flow controllers, or the $CO_2$ capture unit; and wherein determining the one or more parameters comprises:
receiving, from the at least one sensor of the one or more sensors, at least one parameter of the one or more parameters.

12. An automatic control system (ACS) for capturing and utilizing carbon dioxide ($CO_2$) of one or more gases from one or more plants, the ACS comprising:
a plurality of sensors;
a memory; and
a processor configured to:
receive, from at least one sensor of the plurality of sensors, one or more parameters of at least one gas of one or more gases through a system gas flow inlet channel, a first volumetric flow rate of the one or more gases through a plug flow reactor (PFR), a second volumetric flow rate of the one or more gases through a bypass channel that bypasses the PFR, $CO_2$ flowing into a $CO_2$ capture unit, or syngas flowing into the $CO_2$ capture unit, and
command one or more flow controllers to modulate at least one of the first volumetric flow rate of the one or more gases through PFR or the second volumetric flow rate of the one or more gases through the bypass channel based on the one or more parameters and at least one of a predetermined amount of $CO_2$ or a predetermined amount of syngas.

13. The ACS of claim 12, wherein the one or more gases comprise at least one of blast furnace gas (BFG), basic oxygen furnace gas (BOFG), or coke oven gas (COG).

14. The ACS of claim 12, wherein the PFR comprises at least one water gas shift reactor (WGSR).

15. A method implemented by an automatic control system (ACS) for capturing and utilizing carbon dioxide ($CO_2$) of one or more gases from one or more plants, the method comprising:
receiving, from at least one sensor of a plurality of sensors, one or more parameters of at least one gas of one or more gases through a system gas flow inlet channel, a first volumetric flow rate of the one or more gases through a plug flow reactor (PFR), a second volumetric flow rate of the one or more gases through a bypass channel that bypasses the PFR, $CO_2$ flowing into a $CO_2$ capture unit, or syngas flowing into the $CO_2$ capture unit, and
commanding one or more flow controllers to modulate at least one of the first volumetric flow rate of the one or more gases through PFR or the second volumetric flow rate of the one or more gases through the bypass channel based on the one or more parameters and at least one of a predetermined amount of $CO_2$ or a predetermined amount of syngas.

16. The method of claim 15, wherein the ACS commands the one or more flow controllers to modulate the first volumetric flow rate or the second volumetric flow rate based on a cost model that utilizes a cost function to derive a cost based on a total cost loss.

17. The method of claim 15, wherein the one or more gases comprise at least one of blast furnace gas (BFG), basic oxygen furnace gas (BOFG), or coke oven gas (COG).

18. The method of claim 15, wherein the PFR comprises a water gas shift reactor (WGSR).

19. The method of claim 15, wherein the syngas comprises rich carbon monoxide (CO) and $H_2$.

20. The method of claim 15, wherein the one or more parameters comprises at least one a flow rate, a temperature, a pressure, a fuel utilization, or a chemical composition.

* * * * *